US009886920B2

(12) United States Patent
Mok et al.

(10) Patent No.: US 9,886,920 B2
(45) Date of Patent: Feb. 6, 2018

(54) DISPLAY APPARATUS

(71) Applicant: Samsung Display Co., Ltd., Yongin-si, Gyeonggi-do (KR)

(72) Inventors: Rangkyun Mok, Seoul (KR); Yijoon Ahn, Seoul (KR); Wonsang Park, Yongin-si (KR); Jongin Baek, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/157,345

(22) Filed: May 17, 2016

(65) Prior Publication Data

US 2017/0032747 A1 Feb. 2, 2017

(30) Foreign Application Priority Data

Jul. 30, 2015 (KR) ........................ 10-2015-0108263

(51) Int. Cl.

| | |
|---|---|
| ***G09G 5/02*** | (2006.01) |
| ***G09G 3/36*** | (2006.01) |
| ***G09G 3/20*** | (2006.01) |
| ***G09G 3/32*** | (2016.01) |
| ***G09G 5/00*** | (2006.01) |

(Continued)

(52) U.S. Cl.

CPC ......... *G09G 3/3607* (2013.01); *G09G 3/2003* (2013.01); *G09G 3/2074* (2013.01); *G09G 3/3208* (2013.01); *G09G 2300/0452* (2013.01); *G09G 2320/0233* (2013.01); *G09G 2320/0242* (2013.01); *G09G 2320/0276* (2013.01)

(58) Field of Classification Search

CPC combination set(s) only.
See application file for complete search history.

(56) References Cited

U.S. PATENT DOCUMENTS

| | | | |
|---|---|---|---|
| 6,761,131 | B2 | 7/2004 | Suzuki |
| 7,333,117 | B2 | 2/2008 | Kim |

(Continued)

FOREIGN PATENT DOCUMENTS

| | | | |
|---|---|---|---|
| JP | 3820266 | B2 | 6/2006 |
| JP | 2011-072388 | A | 4/2011 |

(Continued)

OTHER PUBLICATIONS

Wright et al., "Light emitting diodes can be used to phase delay the melatonin rhythm", Journal of Pineal Research, Dec. 2001, 31:350-355.

(Continued)

*Primary Examiner* — Wesner Sajous
(74) *Attorney, Agent, or Firm* — Lewis Roca Rothgerber Christie LLP

(57) ABSTRACT

A display apparatus includes: a display panel to display a first image having a first image spectrum corresponding to a first animal spectral sensitivity curve of a first cone cell of an animal, and to display a second image having a second image spectrum corresponding to a second animal spectral sensitivity curve of a second cone cell of the animal, in response to output image data. At least one of the first and second animal spectral sensitivity curves is different from first, second, and third human spectral sensitivity curves of cone cells of a human that perceives red, green, and blue colors.

29 Claims, 19 Drawing Sheets

(51) Int. Cl.

| | |
|---|---|
| ***G06T 11/00*** | (2006.01) |
| ***G06T 5/00*** | (2006.01) |
| ***G06T 5/40*** | (2006.01) |
| ***H04N 1/60*** | (2006.01) |
| *G09G 3/3208* | (2016.01) |

(56) References Cited

U.S. PATENT DOCUMENTS

| | | | | |
|---|---|---|---|---|
| 8,345,338 | B2 | 1/2013 | Jeong et al. | |
| 2015/0204497 | A1* | 7/2015 | Grajcar | F21S 8/006 362/2 |
| 2017/0105391 | A1* | 4/2017 | Grajcar | A01K 45/00 |

FOREIGN PATENT DOCUMENTS

| | | | |
|---|---|---|---|
| KR | 10-0940004 | B1 | 2/2010 |
| KR | 10-2014-0043631 | A | 4/2014 |
| KR | 10-2016-0090454 | A | 8/2016 |
| KR | 10-2016-0092129 | | 8/2016 |

OTHER PUBLICATIONS

Brainard et al., "Action Spectrum for Melatonin Regulation in Humans; Evidence for a Novel Circadian Photoreceptor", The Journal of Neuroscience, Aug. 2001, 21(16):6405-6412.

Kasparson et al., "Colour cues proved to be more informative for dogs than brightness," Proceedings of the Royal Society B 280:20131356, rspb.royalsocietypublishing.org, 2013 (4 pages).

Jacobs et al., "Photopigments of dogs and foxes and their implications for canid vision," Visual Neuroscience, (1993), 10, pp. 173-180.

Peng et al., "620nm red light promotes cellular viability and mRNA expression of Collagen type I in bone mesenchymal stem cells of rat", Department of Orthopedics, Tongji Hospital, Tongji Medical College, Huazhong University of Science and Technology, Wuhan, China, 2010, IEEE, (3 pages).

Lan et al., "Low-energy helium-neon laser induces melanocyte proliferation via interaction with type IV collagen: visible light as a therapeutic option for vitiligo", Clinical and Laboratory Investigations, British Journal of Dermatology, 2009, 161, pp. 273-280.

* cited by examiner

DISPLAY APPARATUS

CROSS-REFERENCE TO RELATED APPLICATION

This U.S. non-provisional patent application claims priority to and the benefit of Korean Patent Application No. 10-2015-0108263, filed on Jul. 30, 2015, in the Korean Intellectual Property Office, the content of which is hereby incorporated herein by reference in its entirety.

BACKGROUND

1. Field

One or more aspects of example embodiments of the present invention relate to a display apparatus.

2. Description of the Related Art

In recent years, various display devices, such as liquid crystal displays, organic light emitting displays, electrowetting display devices, plasma display panels, electrophoretic display devices, etc., have been developed. The display devices may be applied to various electronic equipment, such as smart phones, digital cameras, notebook computers, navigation devices, etc.

In general, the display device displays colors using three primary colors of red, green, and blue colors. The red, green, and blue colors correspond to spectral sensitivity curves of three cone cells of the human eye, respectively.

The above information disclosed in this Background section is for enhancement of understanding of the background of the invention, and therefore, it may contain information that does not constitute prior art.

SUMMARY

One or more aspects of example embodiments of the present invention are directed toward a display apparatus that considers visual characteristics of a user.

According to an embodiment of the present invention, a display apparatus includes: a display panel configured to display a first image having a first image spectrum corresponding to a first animal spectral sensitivity curve of a first cone cell of an animal, and to display a second image having a second image spectrum corresponding to a second animal spectral sensitivity curve of a second cone cell of the animal, in response to output image data, and at least one of the first and second animal spectral sensitivity curves is different from first, second, and third human spectral sensitivity curves of cone cells of a human that perceive red, green, and blue colors, respectively.

The display apparatus may further include a controller configured to output the output image data, and the output image data may include: first primary color image data including information of a first animal primary color corresponding to the first animal spectral sensitivity curve; and second primary color image data including information of a second animal primary color corresponding to the second animal spectral sensitivity curve, and the display panel may be configured to display the first and second images in response to the first and second primary color image data, respectively.

At least one of the first and second animal primary colors may be different from the red, green, and blue colors corresponding to visual characteristics of the human.

At least one of the first and second images may include a non-visible component that is not perceived by the human.

The non-visible component may include an ultraviolet ray and/or a near-ultraviolet ray.

The controller may be configured to generate information corresponding to the non-visible component from input image data.

The controller may be configured to receive input image data, and to convert the input image data to the first primary color image data and the second primary color image data based on the first and second animal primary colors, and the input image data may include information corresponding to the red, green, and blue colors.

At least one of the first and second animal spectral sensitivity curves may include a peak wavelength that is different from peak wavelengths of the first, second, and third human spectral sensitivity curves, and at least one of the first and second animal spectral sensitivity curves may include a full width half maximum that is different from full width half maximums of the first, second, and third human spectral sensitivity curves.

The peak wavelength of the second animal spectral sensitivity curve may be shorter than the peak wavelength of the third human spectral sensitivity curve, the full width half maximum of the second animal spectral sensitivity curve may be wider than the full width half maximum of the third human spectral sensitivity curve, the peak wavelength of the second animal spectral sensitivity curve may be shorter than the peak wavelength of the first animal spectral sensitivity curve, and the peak wavelength of the third human spectral sensitivity curve may be shorter than the peak wavelengths of the first and second human spectral sensitivity curves.

The display panel may include: a first sub-pixel configured to display the first image; and a second sub-pixel configured to display the second image.

The first sub-pixel may include a first color filter having a first transmittance corresponding to the first animal spectral sensitivity curve, and the second sub-pixel may include a second color filter having a second transmittance corresponding to the second animal spectral sensitivity curve.

Center wavelengths of the first and second transmittances may be the same as center wavelengths of the first and second animal spectral sensitivity curves, respectively.

The display apparatus may further include a backlight including: a first light source configured to emit a first light having a first animal primary color corresponding to the first animal spectral sensitivity curve during a first field of a frame period; and a second light source configured to emit a second light having a second animal primary color corresponding to the second animal spectral sensitivity curve during a second field of the frame period, and the display panel may include a liquid crystal layer, the display panel being configured to display the first image during the first field, and to display the second image during the second field.

The first light source may be configured to be turned on during a plurality of first on periods of the first field, and may be configured to be turned off during a first off period between the first on periods, and the second light source may be configured to be turned on during a plurality of second on periods of the second field, and may be configured to be turned off during a second off period between the second on periods.

The frame period may include a first frame period and a second frame period, which may be sequentially arranged, the first frame period may include the first field, the second field, and the first field sequentially arranged, and the second frame period may include the second field, the first field, and the second field sequentially arranged.

The first light may have a brightness lower than a brightness of the second light during the first frame period, and the brightness of the first light may be higher than the brightness of the second light during the second frame period.

The second animal spectral sensitivity curve may include a short wavelength component and a long wavelength component, the second image may include a third image having a third image spectrum corresponding to the short wavelength component, and a fourth image having a fourth image spectrum corresponding to the long wavelength component, and the display panel may be configured to divide the second image into the third and fourth images, and to display the third and fourth images.

The display panel may include a first sub-pixel configured to display the first image, a third sub-pixel configured to display the third image, and a fourth sub-pixel configured to display the fourth image.

The first sub-pixel may include a first color filter configured to transmit the first image, the third sub-pixel may include a third color filter configured to transmit the third image, and the fourth sub-pixel may include a fourth color filter configured to transmit the fourth image.

The third image may include an ultraviolet ray or a near-ultraviolet ray.

The display apparatus may further include a backlight including: a first light source configured to emit a first light having a first animal primary color during a first field of a frame period; a third light source configured to emit a third light having a color corresponding to a third animal spectral sensitivity curve during a second field of the frame period; and a fourth light source configured to emit a fourth light having a color corresponding to a fourth animal spectral sensitivity curve during a third field of the frame period, and the display panel may include a liquid crystal layer, the display panel being configured to display the first image during the first field, to display the third image during the second field, and to display the fourth image during the third field.

The third light source may be configured to emit the third light during a third on period, the fourth light source may be configured to emit the fourth light during a fourth on period, and at least a portion of the third on period may be overlapped with the fourth on period.

A width of the third on period may be the same as a width of the fourth on period, and the third and fourth on periods may be provided concurrently.

According to an embodiment of the present invention, a display apparatus includes a display panel configured to display an image including a non-visible component in response to output image data including information corresponding to the non-visible component that is not perceived by a human.

The non-visible component may include an ultraviolet ray and/or a near-ultraviolet ray.

The display apparatus may further include a backlight source configured to emit a light including the non-visible component, and the display panel may be configured to receive the light and to display the image using the light.

The display panel may include a color filter configured to transmit the non-visible component.

The display apparatus may further include a controller configured to receive input image data that does not include the non-visible component, and to convert the input image data to the output image data.

According to an embodiment of the present invention, a display apparatus includes: a controller configured to map a first color gamut of input image data to a second color gamut to convert the input image data to output image data; and a display panel configured to display a first image having a first animal primary color, and to display a second image having a second animal primary color in response to the output image data, the first color gamut including red, green, and blue colors, the second color gamut including the first and second animal primary colors, and the first animal primary color includes a first spectrum corresponding to a first animal spectral sensitivity curve of a first cone cell of an animal, and the second animal primary color includes a second spectrum corresponding to a second animal spectral sensitivity curve of a second cone cell of the animal.

According to one or more example embodiments of the present invention, animals having cone cells different from those of humans may perceive the same image as an intended image (e.g., a real image) of an object through the image displayed on the display panel.

BRIEF DESCRIPTION OF THE DRAWINGS

The above and other aspects and features of the present invention will become readily apparent by reference to the following detailed description when considered in conjunction with the accompanying drawings wherein.

DETAILED DESCRIPTION

Figure 1:
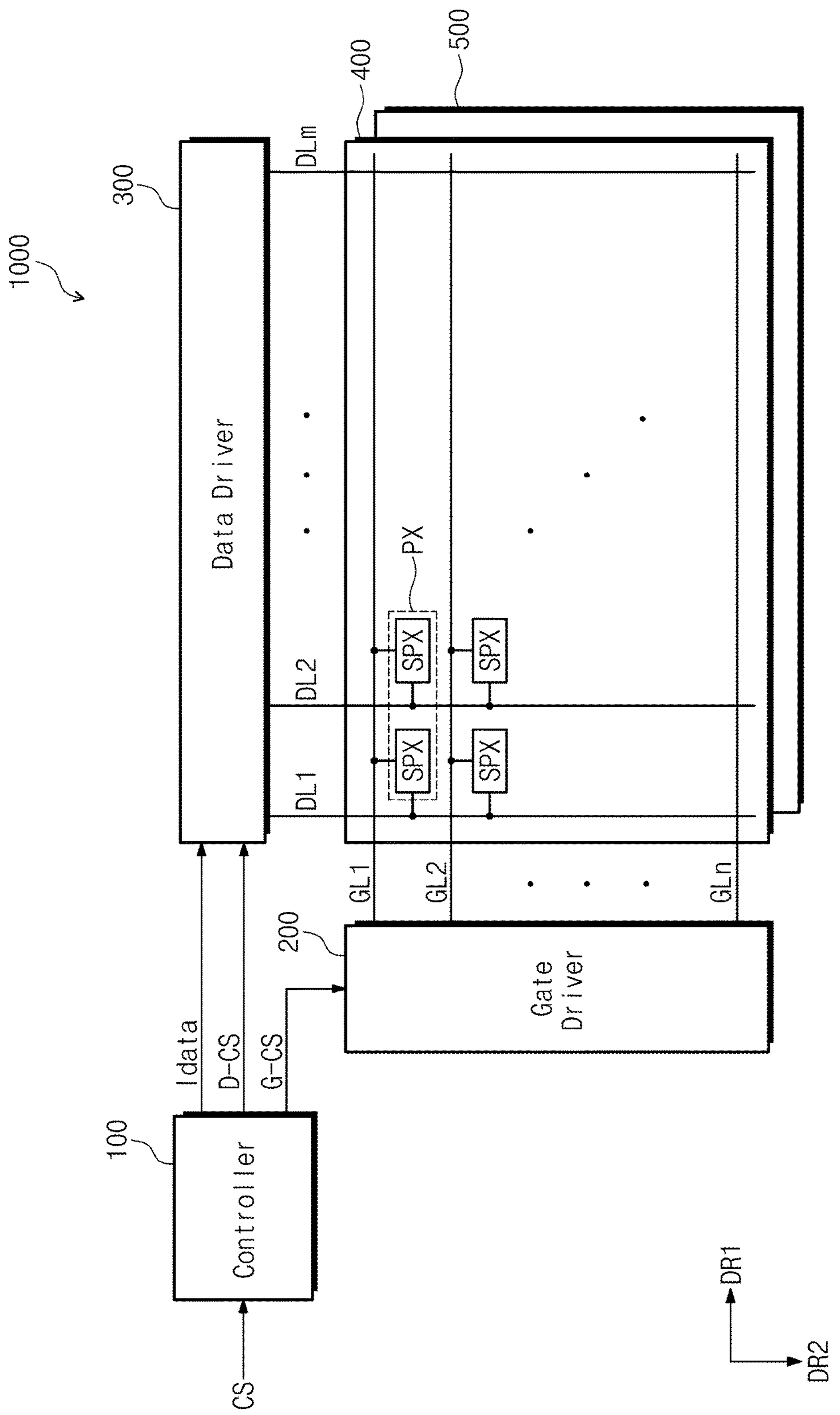
FIG. 1 is a block diagram showing a display apparatus according to an exemplary embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, one or more aspects of exemplary embodiments of the present invention will be described in more detail with reference to the accompanying drawings.

FIG. 1 is a block diagram showing a display apparatus 1000 according to an exemplary embodiment of the present invention.

Referring to FIG. 1, the display apparatus 1000 includes a display panel 400 for displaying an image, and a panel driver for driving the display panel 400. The panel driver includes a gate driver 200, a data driver 300, and a controller 100 for controlling the gate driver 200 and the data driver 300.

The controller 100 receives a plurality of control signals CS from an external source (e.g., external to the display apparatus 1000 or external to the controller 100). The controller 100 generates a data control signal D-CS (e.g., including an output start signal, a horizontal start signal, etc.), and a gate control signal G-CS (e.g., including a vertical start signal, a vertical clock signal, a vertical clock bar signal, etc.), based on the control signals CS. The data control signal D-CS is applied to the data driver 300, and the gate control signal G-CS is applied to the gate driver 200.

The gate driver 200 sequentially outputs gate signals in response to the gate control signal G-CS provided from the controller 100. The gate signals are applied to the display panel 400.

The data driver 300 receives output image data Idata from the controller 100. The data driver 300 converts the output image data Idata to data voltages in response to the data control signal D-CS provided from the controller 100. The data voltages are applied to the display panel 400.

The display panel 400 includes a plurality of gate lines GL1 to GLn, a plurality of data lines DL1 to DLm, and a plurality of sub-pixels SPX, where n and m are natural numbers.

FIG. 1 shows four sub-pixels SPX from among the sub-pixels SPX as a representative example, and other sub-pixels SPX have been omitted for convenience.

The gate lines GL1 to GLn extend in a first direction DR1, and are arranged along a second direction DR2. The data lines DL1 to DLm are insulated from the gate lines GL1 to GLn, and cross the gate lines GL1 to GLn. For example, the data lines DL1 to DLm extend in the second direction DR2, and are arranged along the first direction DR1. The first direction DR1 may be perpendicular or substantially perpendicular to the second direction DR2.

The sub-pixels SPX are arranged in a matrix form along the first and second directions DR1 and DR2.

The sub-pixels SPX may be grouped into pixels PX. Each pixel PX displays a unit image, and the display panel 400 has a resolution that may be determined depending on the number of the pixels PX included in the display panel 400.

As an example, two sub-pixels SPX are grouped together for one pixel PX, but the number of the sub-pixels SPX that are grouped together for one pixel PX is not limited to two. For example, three or more sub-pixels SPX may be grouped together for one pixel PX, or each sub-pixel SPX may be defined as one pixel PX.

Each of the sub-pixels SPX is connected to a corresponding data line of the data lines DL1 to DLm, and connected to a corresponding gate line of the gate lines GL1 to GLn.

The display panel 400 is not limited to a specific display panel. That is, various display panels, such as an organic light emitting display panel, a liquid crystal display panel, a plasma display panel, an electrophoretic display panel, an electrowetting display panel, etc., may be used as the display panel 400. Hereinafter, for convenience of explanation, the display panel 400 will be described as a liquid crystal display panel 400. As shown in FIG. 1, when the display panel 400 is the liquid crystal display panel 400, the display apparatus 1000 may further include a backlight unit (e.g., a backlight or a backlight source) 500. However, the present invention is not limited thereto, and when the display panel 400 is, for example, an organic light emitting display panel, the backlight unit 500 may be omitted.

Figure 2A:
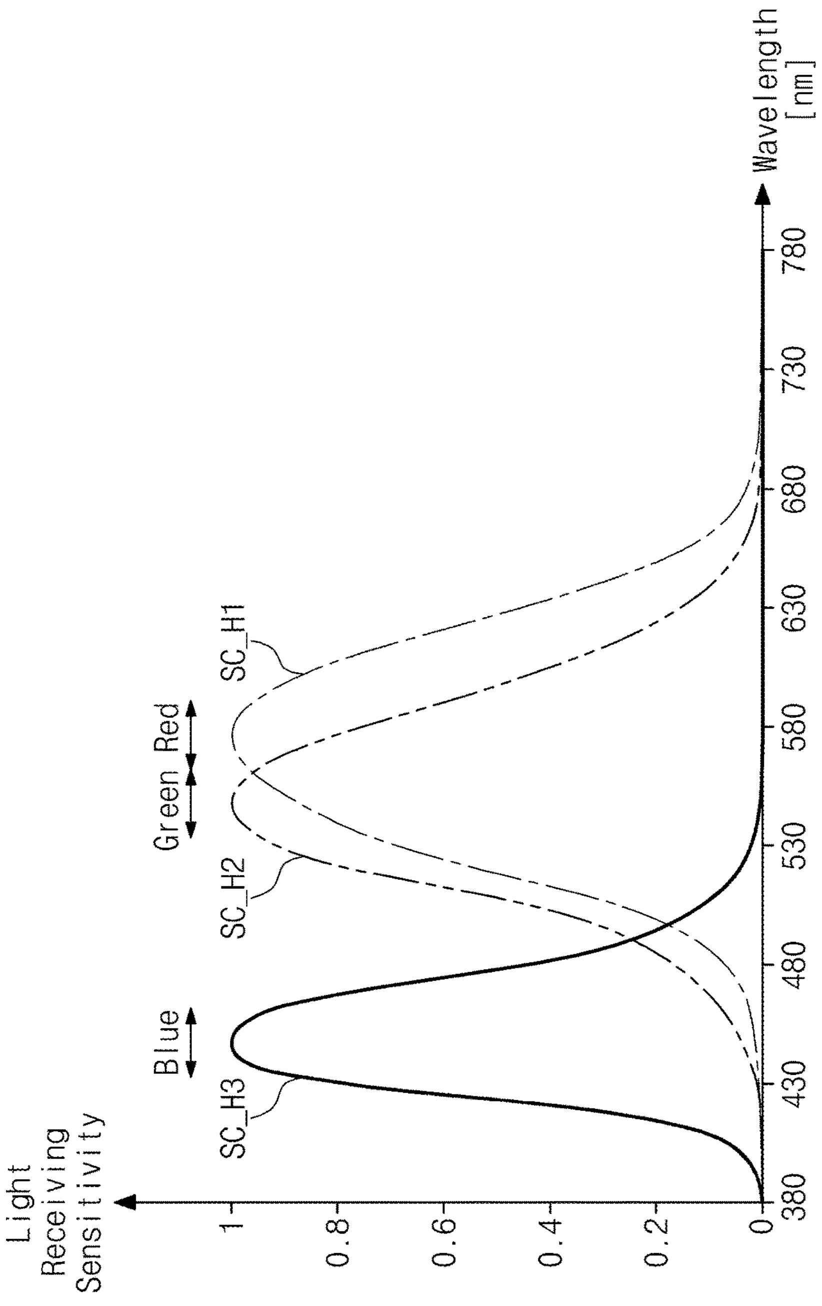
FIG. 2A is a view showing three primary colors according to visual characteristics of a human.
Figure 2B:
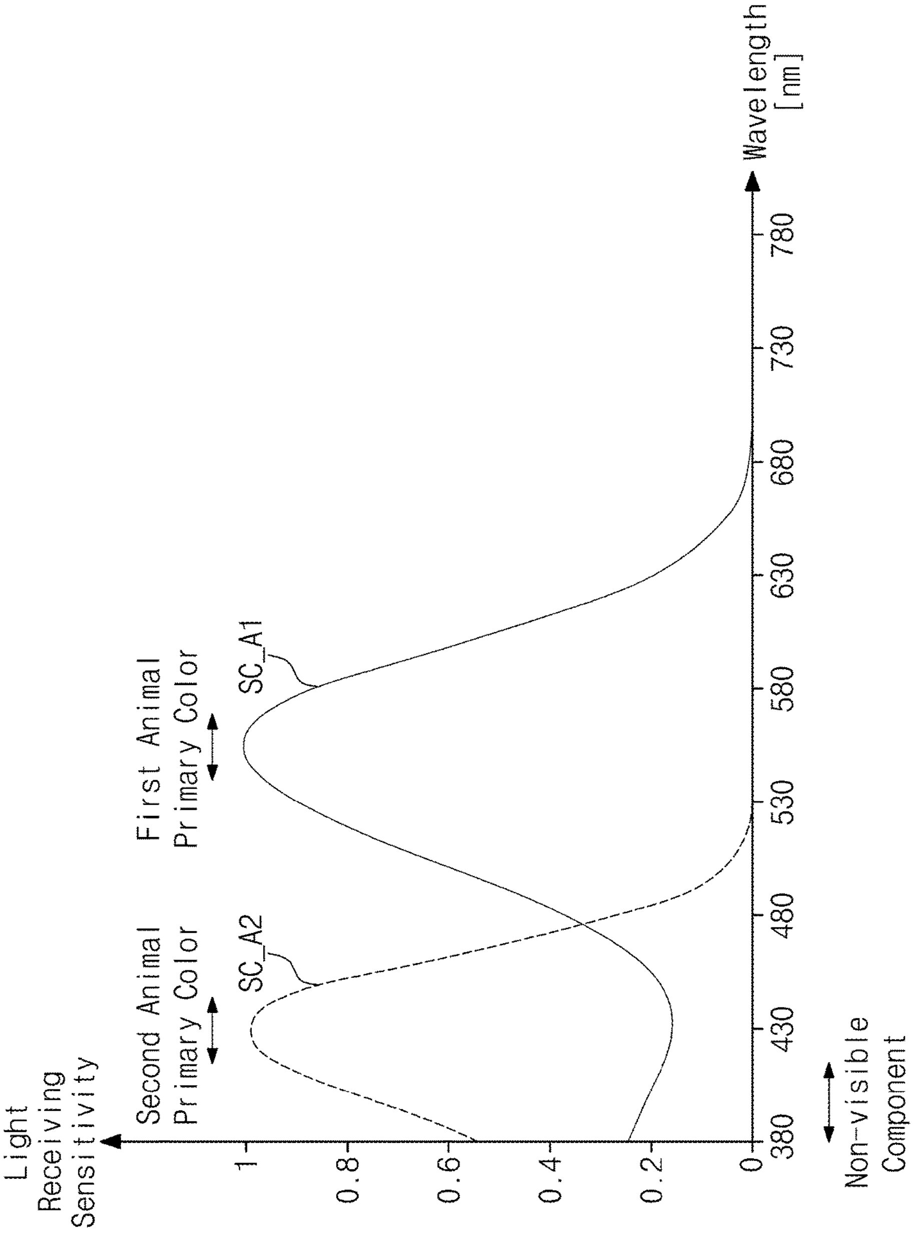
FIG. 2B is a view showing first and second animal primary colors according to visual characteristics of a dog.

FIG. 2A is a view showing three primary colors according to visual characteristics of a human, and FIG. 2B is a view showing first and second animal primary colors according to visual characteristics of a dog.

In general, a display apparatus displays an image using three primary colors. The three primary colors include red, green, and blue colors, and are determined depending on visual characteristics of the human eye for perceiving colors in trichromacy. The red, green, and blue colors are perceived by a first human cone cell (e.g., an L cone cell), a second human cone cell (e.g., an M cone cell), and a third human cone cell (e.g., an S cone cell), respectively.

FIG. 2A shows a first human spectral sensitivity curve SC_H1 of the first human cone cell, a second human spectral sensitivity curve SC_H2 of the second human cone cell, and a third human spectral sensitivity curve SC_H3 of the third human cone cell. The first, second, and third human spectral sensitivity curves SC_H1, SC_H2, and SC_H3 correspond to the red, green, and blue colors, respectively.

As shown in FIG. 2A, the first human spectral sensitivity curve SC_H1 represents a light receiving sensitivity of the first human cone cell as a function of a wavelength, and a peak wavelength of the wavelength is about 580 nm. The second human spectral sensitivity curve SC_H2 represents a light receiving sensitivity of the second human cone cell as a function of a wavelength, and a peak wavelength of the wavelength is about 540 nm. The third human spectral sensitivity curve SC_H3 represents a light receiving sensitivity of the third human cone cell as a function of a wavelength, and a peak wavelength of the wavelength is about 446 nm.

As shown in FIG. 2B, the first and second animal primary colors are determined depending on the visual characteristics of the dog. In more detail, the first and second animal primary colors are perceived by the first and second animal cone cells, respectively, that are formed on a retina of the dog. Hereinafter, the operation of the display apparatus according to an embodiment of the present invention will be described with reference to the dog being an animal other than the human, but the present invention is not limited thereto. That is, the first and second animal primary colors may be determined depending on visual characteristics of animals other than the dog.

FIG. 2B shows a first animal spectral sensitivity curve SC_A1 of a first animal cone cell, and a second animal spectral sensitivity curve SC_A2 of a second animal cone cell. The first and second animal cone cells may be cone cells on the retina of the dog. The first and second animal spectral sensitivity curves SC_A1 and SC_A2 may correspond to the first and second animal primary colors, respectively.

As shown in FIG. 2B, the first animal spectral sensitivity curve SC_A1 represents a light receiving sensitivity of the first animal cone cell as a function of a wavelength, and a peak wavelength of the wavelength is about 555 nm. In addition, the second animal spectral sensitivity curve SC_A2 represents a light receiving sensitivity of the second animal cone cell as a function of a wavelength, and a peak wavelength of the wavelength is about 430 nm.

As shown in FIGS. 2A and 2B, the first and second animal spectral sensitivity curves SC_A1 and SC_A2 are different from the first to third human spectral sensitivity curves SC_H1 to SC_H3. In more detail, the peak wavelengths of the first and second animal spectrum sensitivity curves SC_A1 and SC_A2 are different from the peak wavelengths of the first to third human spectral sensitivity curves SC_H1 to SC_H3, and full width half maximums of the first and second animal spectrum sensitivity curves SC_A1 and SC_A2 are different from full width half maximums of the first to third human spectral sensitivity curves SC_H1 to SC_H3.

Although the human and the dog may view a same object in the same way, the human and the dog may sense different primary colors from the same object, and may process information about the sensed primary colors differently to perceive colors or objects differently due to the difference between the spectral sensitivity curves. Accordingly, even though the dog perceives the image displayed on the display panel that is designed and driven for the human, the dog does not necessarily perceive the same image as the object. Therefore, the display panel according to an exemplary embodiment of the present invention may be designed and driven to allow animals, other than humans, to perceive the same image as the object by using the difference between the spectral sensitivity curves.

For example, an ultraviolet ray and/or a near-ultraviolet ray may not be perceived by the human (e.g., a naked human eye). In more detail, the human may not have cone cells required to sense the ultraviolet ray and/or the near-ultraviolet ray, and a crystalline lens of the human eye may not transmit the ultraviolet ray and/or the near-ultraviolet ray. In comparison, a crystalline lens of the dog may transmit the ultraviolet ray and/or the near-ultraviolet ray, and the second animal spectral sensitivity curve SC_A2 may be overlapped with areas corresponding to the ultraviolet ray and/or the near-ultraviolet ray. Accordingly, the dog may sense and perceive the ultraviolet ray and/or the near-ultraviolet ray provided from the object. Thus, the display panel according to an exemplary embodiment of the present invention may be designed and driven to display the ultraviolet ray and/or the near-ultraviolet ray.

Hereinafter, a light that is not capable of being sensed by the cone cells of the human and/or not capable of being perceived by the human will be referred to as a non-visible component. For example, the non-visible component may include the ultraviolet ray and/or the near-ultraviolet ray, but is not limited thereto or thereby. That is, the non-visible component may include a light having a wavelength longer than a red wavelength, and may include an infrared ray and/or a near-infrared ray.

Figure 3:
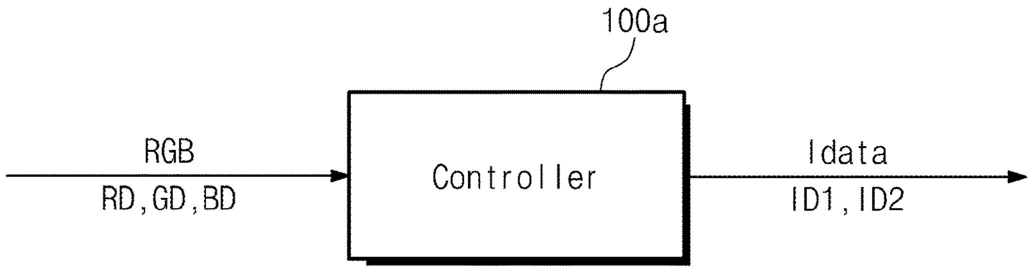
FIG. 3 is a view showing an operation of a controller shown in FIG. 1.

FIG. 3 is a view showing an operation of a controller 100*a* corresponding to the controller 100 shown in FIG. 1.

Referring to FIG. 3, the controller 100*a* receives input image data RGB including information for the image from an external source. The controller 100*a* converts the input image data RGB to the output image data Idata in consideration of specifications of the gate driver 200 (refer to FIG. 1), the data driver 300 (refer to FIG. 1), and the display panel 400 (refer to FIG. 1), and applies the output image data Idata to the data driver 300.

According to one or more exemplary embodiments of the present invention, the input image data RGB may include information for colors corresponding to the visual characteristics of the human (e.g., red, green, and blue colors). For example, the input image data RGB may include red, green, and blue data RD, GD, and BD having information for the red, green, and blue colors, respectively. The input image data RGB may not include the non-visible component, since the input image data RGB are provided based on the human.

The output image data Idata may include information for colors corresponding to the visual characteristics of one or more animals other than the human. For example, the output image data Idata may include first primary color image data ID1 and second primary color image data ID2. The first and second primary color image data ID1 and ID2 may include information for the first and second animal primary colors, respectively. Since the output image data Idata may be provided for the dog or an animal other than the human, the output image data Idata may include information corresponding to the non-visible component. In this case, the controller 100*a* generates the information corresponding to the non-visible component based on the input image data RGB, and generates the output image data Idata using the information corresponding to the non-visible component.

The controller 100*a* generates the output image data Idata based on the input image data RGB. In other words, the controller 100*a* maps a first color gamut of the input image data RGB to a second color gamut to convert the input image data RGB to the output image data Idata. Here, the first color gamut is defined by the red, green, and blue colors, and the second color gamut is defined by the first and second animal primary colors.

For example, the controller 100_a_ may convert the input image data RGB to the output image data Idata based on the visual characteristics of the human and/or based on the visual characteristics of the dog. In more detail, the controller 100_a_ performs the converting operation based on the first and second animal spectral sensitivity curves SC_A1 and SC_A2.

For example, the controller 100_a_ may generate the first and second primary color image data ID1 and ID2 by using a correlation between the first and second animal spectral sensitivity curves SC_A1 and SC_A2 and the first to third human spectral sensitivity curves SC_H1 to SC_H3, or by analyzing the spectrum of the input image data RGB and using the analyzed result.

In addition, the input image data RGB may include information for the first and second animal primary colors. In this case, since the input image data RGB already include information corresponding to the visual characteristics of the dog, the controller 100_a_ may not perform a process of converting the input image data RGB in consideration of the visual characteristics of the dog.

Figure 4:
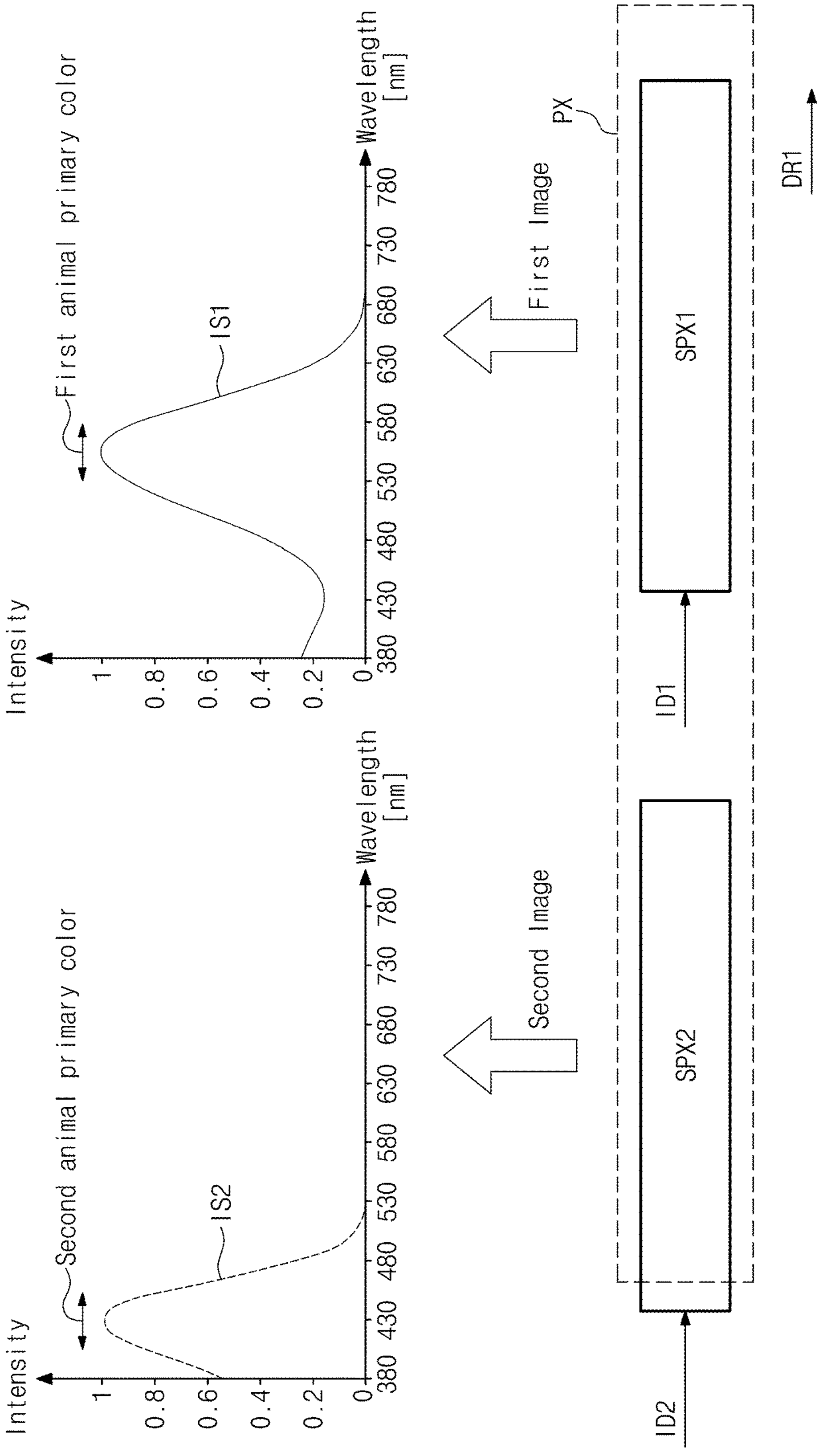
FIG. 4 is a view showing a pixel according to an exemplary embodiment of the present invention.

FIG. 4 is a view showing a pixel according to an exemplary embodiment of the present invention.

FIG. 4 shows the first and second sub-pixels SPX1 and SPX2. The first sub-pixel SPX1 may be adjacent to the second sub-pixel SPX2 in the first direction DR1. The first and second sub-pixels SPX1 and SPX2 may form one pixel PX. The first and second sub-pixels SPX1 and SPX2 and the pixel PX may have the same or substantially the same structure and function as those of the sub-pixels SPX and the pixel PX described with reference to FIG. 1, and thus, details thereof will be omitted.

The first image may represent the first animal primary color. For example, the first and second sub-pixels SPX1 and SPX2 may display first and second images, respectively. The first image includes a first image spectrum IS1 corresponding to the first animal spectral sensitivity curve SC_A1 (refer to FIG. 2). A center wavelength of the first image spectrum IS1 may be the same or substantially the same as a center wavelength of the first animal spectral sensitivity curve.

In addition, the second image may represent the second animal primary color. For example, the second image includes a second image spectrum IS2 corresponding to the second animal spectral sensitivity curve SC_A2 (refer to FIG. 2). A center wavelength of the second image spectrum IS2 may be the same or substantially the same as a center wavelength of the second animal spectral sensitivity curve. In this case, the second image spectrum IS2 may include components corresponding to the non-visible components.

The first sub-pixel SPX1 receives the first primary color image data ID1, and displays the first image in response to the first primary color image data ID1. The second sub-pixel SPX2 receives the second primary color image data ID2, and displays the second image in response to the second primary color image data ID2. For example, the first and second primary color image data ID1 and ID2 may be provided as a shape of the data voltage.

In the case where the animal (e.g., the dog) has different cone cells from that of the human, and perceives the image of the object displayed through the display panel designed and driven in consideration of the visual characteristics of the human, the animal perceives the image differently from the intended image (e.g., real image) of the object.

However, according to one or more embodiments of the present invention, the pixel PX is applied with the first and second primary color image data ID1 and ID2 including information corresponding to the first and second primary colors, instead of the input image data RGB (refer to FIG. 3) generated with reference to the visual characteristics of the human. In addition, when the first and second sub-pixels SPX1 and SPX2 are driven corresponding to the first and second animal primary colors to display the first and second primary color image data ID1 and ID2, the animal (e.g., the dog) may perceive the same image as the desired image (e.g., the real image) of the object through the first and second images.

Figure 5:
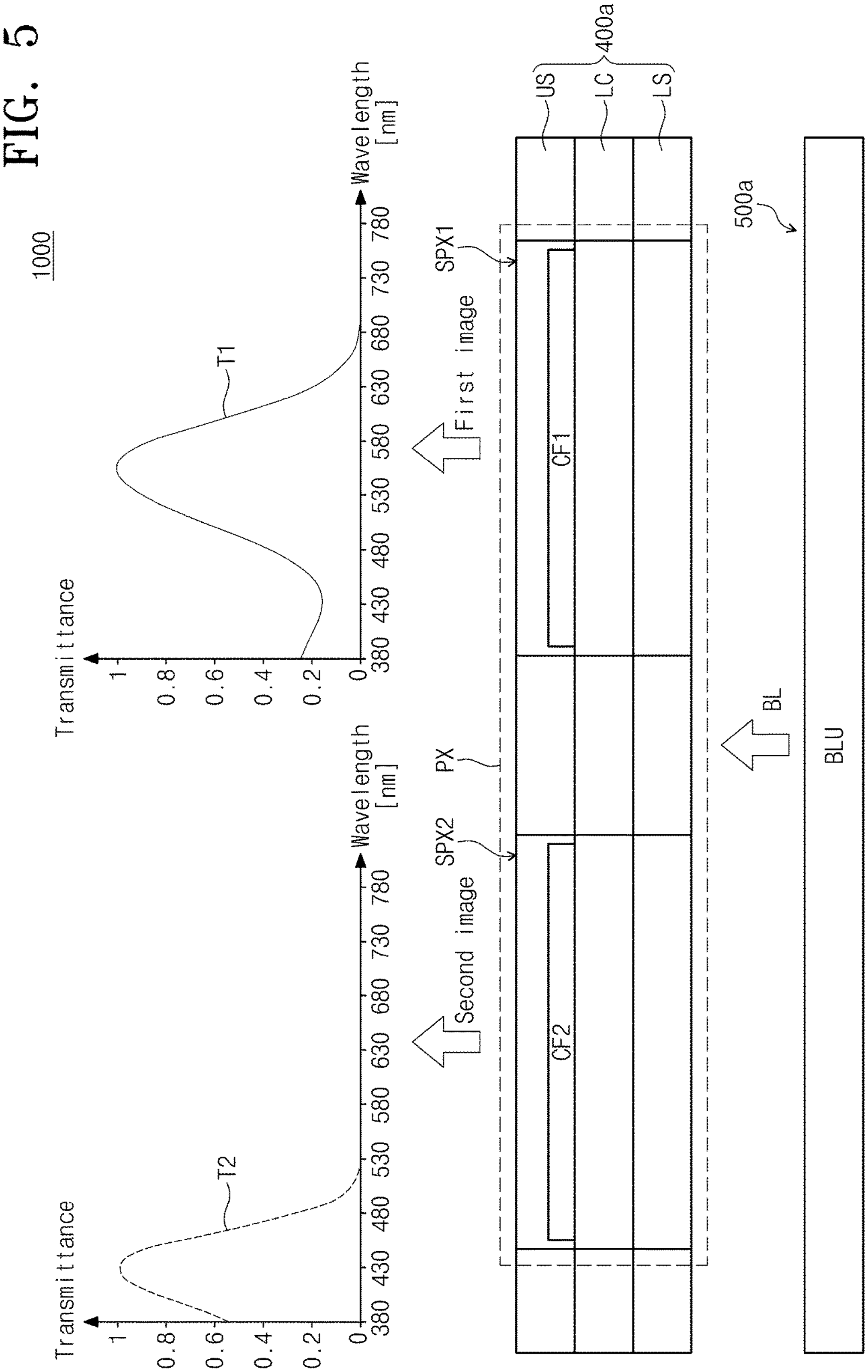
FIG. 5 is a cross-sectional view showing a display apparatus according to an exemplary embodiment of the present invention.

FIG. 5 is a cross-sectional view showing the display apparatus 1000 according to an exemplary embodiment of the present invention.

Referring to FIG. 5, the display apparatus 1000 may include, but not limited to, a liquid crystal display. In more detail, the display apparatus 1000 may include a backlight unit (e.g., a backlight or a backlight source) 500_a_, and a display panel 400_a_. The display panel 400_a_ includes a lower substrate LS, an upper substrate US, a color filter CF, and a liquid crystal layer LC.

The backlight unit 500_a_ may be located at a rear side of the display panel 400_a_, and may provide a backlight BL to the rear side of the display panel 400_a_. The backlight BL includes the first and second animal primary colors. In more detail, the backlight BL includes a light having a wavelength in a range (e.g., of about 360 nm to about 640 nm) in which the first and second animal spectral sensitivity curves SC_A1 and SC_A2 are distributed.

The backlight unit 500_a_ may include a light source for generating the backlight, and an optical sheet for controlling a distribution of the backlight BL.

The liquid crystal layer LC is between the lower substrate LS and the upper substrate US. The upper and lower substrates US and LS respectively include electrodes to form an electrical field in the liquid crystal layer LC. The electrodes correspond to the first and second sub-pixels SPX1 and SPX2. Liquid crystal molecules included in the liquid crystal layer LC are controlled by the electrical field, and thus, a transmittance of the first and second sub-pixels SPX1 and SPX2 with respect to the backlight BL may be controlled.

The color filter CF includes a first color filter CF1 and a second color filter CF2. For example, the first and second color filters CF1 and CF2 are included in the upper substrate US, and form the first and second sub-pixels SPX1 and SPX2, respectively, but the present invention is not limited thereto. The first and second sub-pixels SPX1 and SPX2 may have colors depending on the transmittance in accordance with the wavelength of the first and second color filters CF1 and CF2.

In more detail, a first transmittance T1 of the first color filter CF1 may correspond to the first animal spectral sensitivity curve SC_A1 (refer to FIG. 2). For example, a center wavelength of the first transmittance T1 may be the same or substantially the same as a center wavelength of the first animal spectral sensitivity curve SC_A1. Accordingly, the backlight BL passing through the first color filter CF1 corresponds to the first animal primary color, and the first sub-pixel SPX1 displays the first image.

A second transmittance T2 of the second color filter CF2 may correspond to the second animal spectral sensitivity curve SC_A2 (refer to FIG. 2). For example, a center wavelength of the second transmittance T2 may be the same or substantially the same as a center wavelength of the second animal spectral sensitivity curve SC_A2. Therefore, the backlight BL passing through the second color filter CF2 corresponds to the second animal primary color, and the second sub-pixel SPX2 displays the second image.

As described above, the display panel 400*a* may display the first and second images corresponding to the first and second primary color image data ID1 and ID2 to be spatially divided by using the first and second color filters CF1 and CF2.

FIG. 5 shows a direct-illumination type (e.g., kind) backlight unit in which the backlight unit 500*a* is located under the display panel 400*a*, and directly provides the backlight BL to the rear surface of the display panel 400*a*, but the present invention is not limited thereto. That is, the backlight unit 500*a* may be an edge-illumination type (e.g., kind) backlight unit. In this case, the backlight unit 500*a* includes a light source for emitting the backlight light BL towards the first direction DR1, and a light guide plate for converting the backlight BL to a surface light source, to provide the surface light source to the rear surface of the display panel 400*a*.

Figure 6:
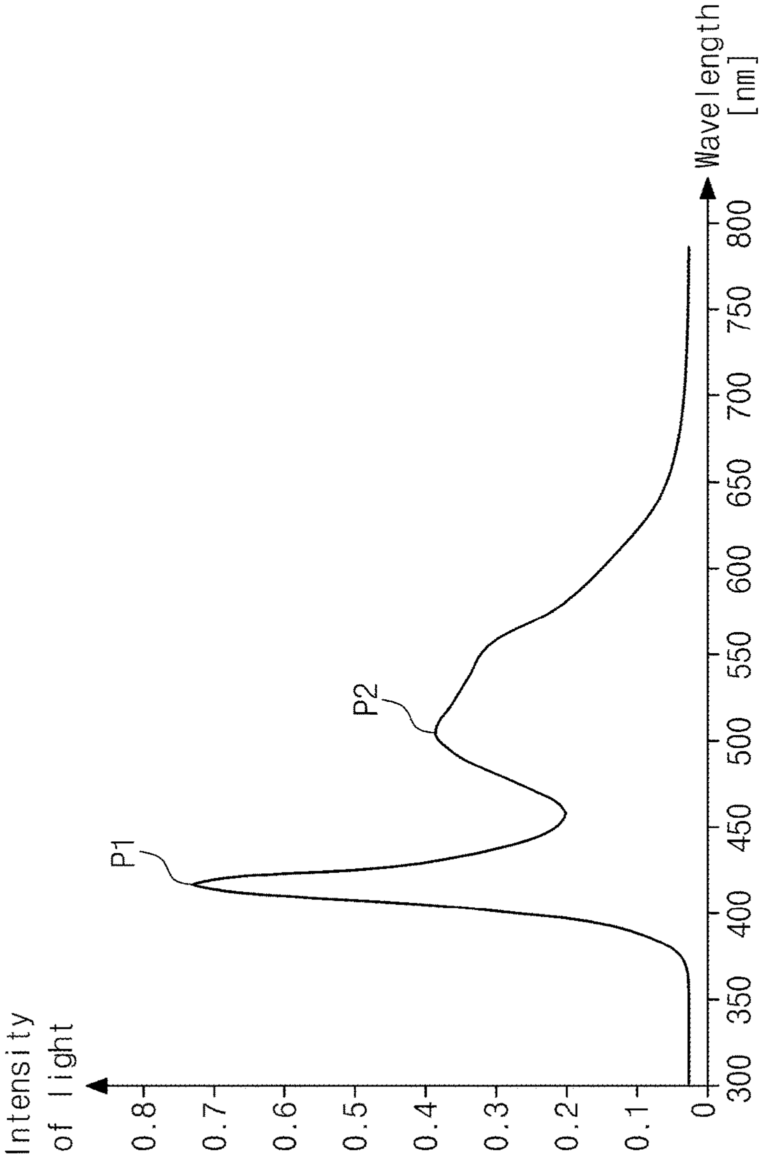
FIG. 6 is a graph showing a spectrum of a first backlight shown in FIG. 5.

FIG. 6 is a graph showing a spectrum of a first backlight shown in FIG. 5.

In FIG. 6, the x-axis represents wavelength, and the y-axis represents intensity of light. Referring to FIG. 6, the backlight BL includes the light having the wavelength in the range (e.g., of about 360 nm to about 640 nm) in which the first and second animal spectral sensitivity curves SC_A1 and SC_A2 are distributed.

The backlight BL may include a first peak P1 and a second peak P2. The first peak P1 may have a center wavelength of about 380 nm to about 483 nm, and may have a full width half maximum of about 5 nm to about 50 nm. The second peak P2 may have a center wavelength of about 480 nm to about 580 nm (e.g., wavelengths of normal yellow/green/red), and may have a full width half maximum of about 5 nm to about 50 nm.

Figure 7:
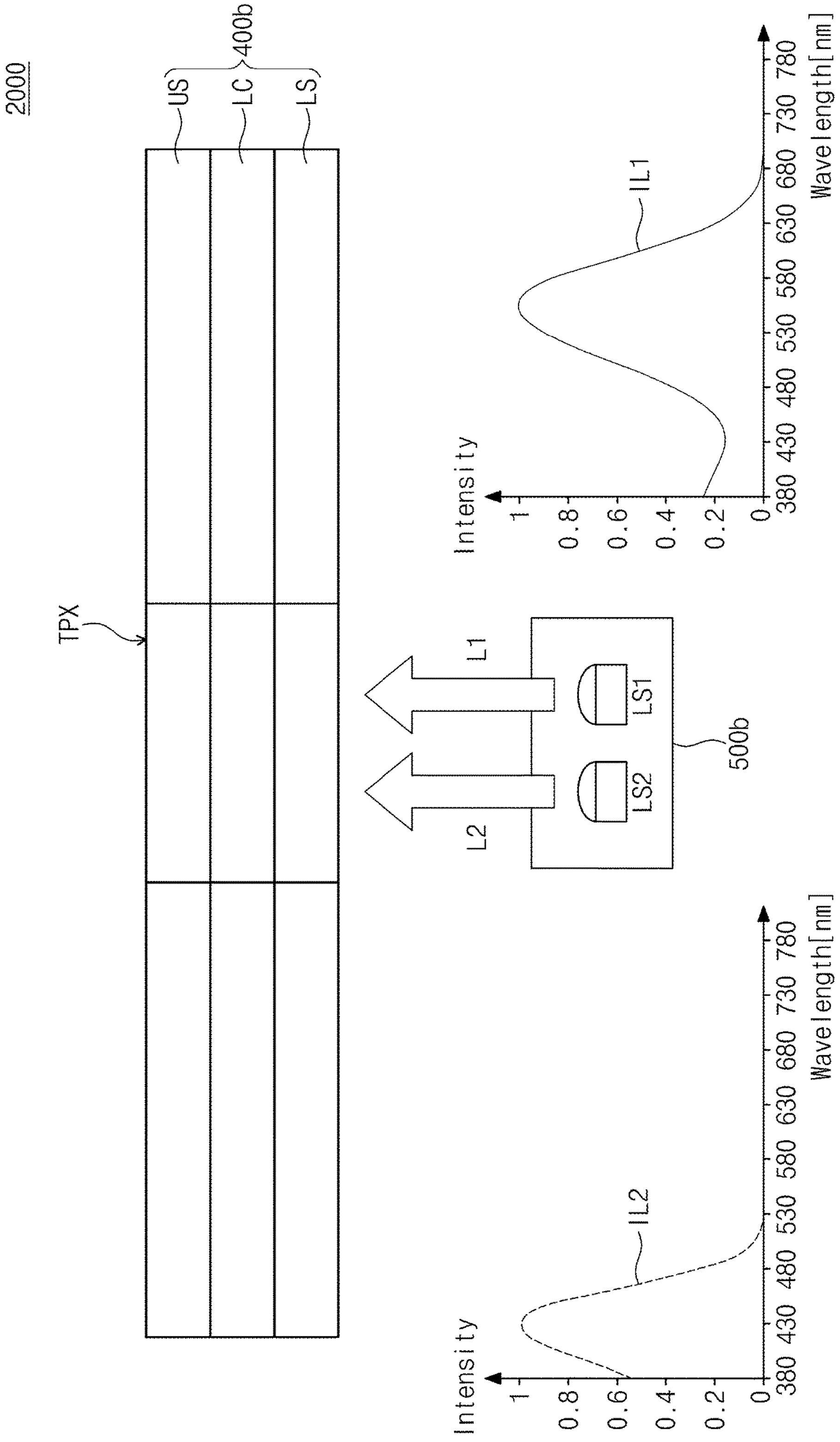
FIG. 7 is a cross-sectional view showing a display apparatus according to another exemplary embodiment of the present invention.

FIG. 7 is a cross-sectional view showing a display apparatus 2000 according to another exemplary embodiment of the present invention.

Referring to FIG. 7, the display apparatus 2000 includes a display panel 400*b* and a backlight unit (e.g., a backlight or backlight source) 500*b*, and is operated in a time division driving fashion.

The display panel 400*b* includes a transmissive pixel TPX. The transmissive pixel TPX has the same or substantially the same structure and function as those of the first and second sub-pixels SPX1 and SPX2, except that the transmissive pixel TPX does not include the color filter. Thus, repeat details thereof will be omitted.

Since the transmissive pixel TPX does not include the color filter, the color of the light is not changed while passing through the transmissive pixel TPX.

The backlight unit 500*b* includes a first light source LS1 for emitting a first light L1, and a second light source LS2 for emitting a second light L2. The first light L1 may include the first animal primary color. For example, the first light L1 may include a first light spectrum IL1 corresponding to the first animal spectral sensitivity curve SC_A1. The center wavelength of the first light spectrum IL1 may be the same or substantially the same as the center wavelength of the first animal spectral sensitivity curve SC_A1.

The second light L2 may include the second animal primary color. For example, the second light L2 may include a second light spectrum IL2 corresponding to the second animal spectral sensitivity curve SC_A2. The center wavelength of the second light spectrum IL2 may be the same or substantially the same as the center wavelength of the second animal spectral sensitivity curve SC_A2. In this case, the second image spectrum IS2 may include components corresponding to the non-visible components.

Figure 8:
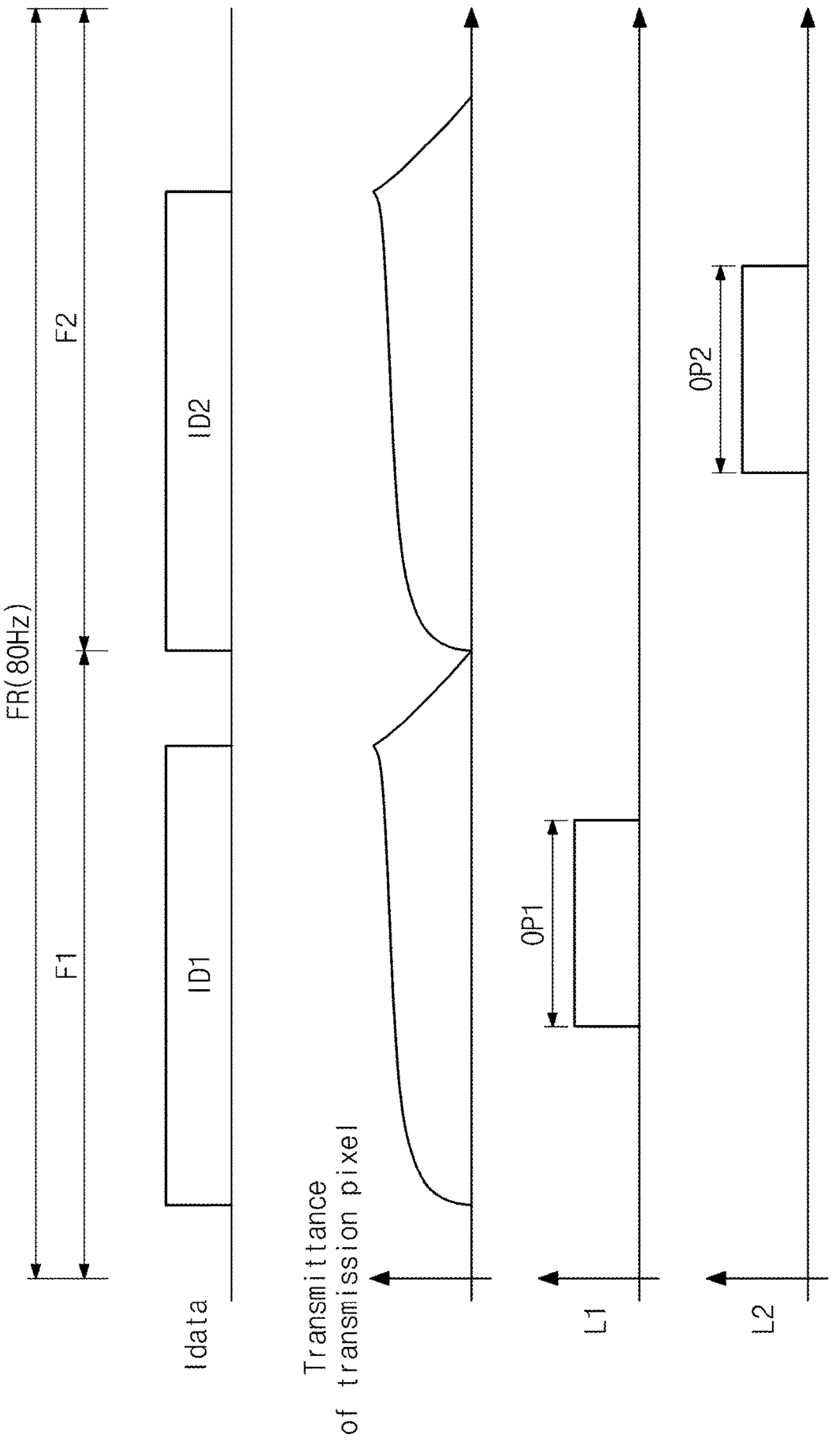
FIG. 8 is a view showing a time division driving operation of a display apparatus shown in FIG. 7 according to another exemplary embodiment of the present invention.

FIG. 8 is a view showing a time division driving operation of a display apparatus shown in FIG. 7 according to another exemplary embodiment of the present invention.

Hereinafter, the time division driving operation of the display apparatus will be described in more detail with reference to FIGS. 7 and 8. One frame period FR includes a first field F1 and a second field F2, which are sequentially provided. FIG. 8 shows one frame period FR from among the frame periods that may be repeated.

During the first field F1, the transmissive pixel TPX receives the first primary color image data ID1. Accordingly, the transmissive pixel TPX has a transmittance corresponding to the first primary color image data ID1.

In addition, the first light source LS1 emits the first light L1 during the first field F1. In more detail, the first light L1 is provided during a first on period OP1 defined in the first field F1.

As a result, the first light L1 passing through the transmissive pixel TPX has a brightness that is adjusted by the transmittance of the transmissive pixel TPX, and the transmissive pixel TPX displays the first image representing the first animal primary color using the first light L1.

The transmissive pixel TPX receives the second primary color image data ID2 during the second field F2. Therefore, the transmissive pixel TPX has a transmittance corresponding to the second primary color image data ID2.

In addition, the first light source LS1 does not emit the first light L1 during the second field F2, and the second light source LS2 emits the second light L2 during the second field F2. In more detail, the second light L2 is provided during a second on period OP2 defined in the second field F2.

As a result, the second light L2 passing through the transmissive pixel TPX has a brightness that is adjusted by the transmittance of the transmissive pixel TPX, and the transmissive pixel TPX displays the second image representing the second animal primary color using the second light L2.

As described above, the display panel 400*b* displays the first and second images corresponding to the first and second primary color image data ID1 and ID2 after dividing the first and second images in time using the first and second fields F1 and F2.

In addition, since the transmissive pixel TPX does not include the color filter, the transmissive pixel TPX transmits the first and second lights L1 and L2 without loss or substantially without loss of the first and second lights L1 and L2, which may occur when a color filter is used. Thus, a light efficiency of the display apparatus 2000 may be improved.

A frequency of the frame period FR may be determined depending on the visual characteristics of the animal (e.g., the dog). In general, a critical frequency of the animal may be different from a critical frequency of the human. In more detail, since the critical frequency of the animal may be higher than about 60 Hz, which is the critical frequency of the human, the animal may perceive image flickering in the unit of a frame when the display apparatus displays the image at the frequency of about 60 Hz.

Thus, according to some embodiments of the present invention, the frame period FR may have a frequency that is higher than the critical frequency of the animal. For example, the frame period FR may be provided at a frequency of about 80 Hz, and each of the first and second fields F1 and F2 may be provided at a frequency of about 160 Hz.

Figure 9:
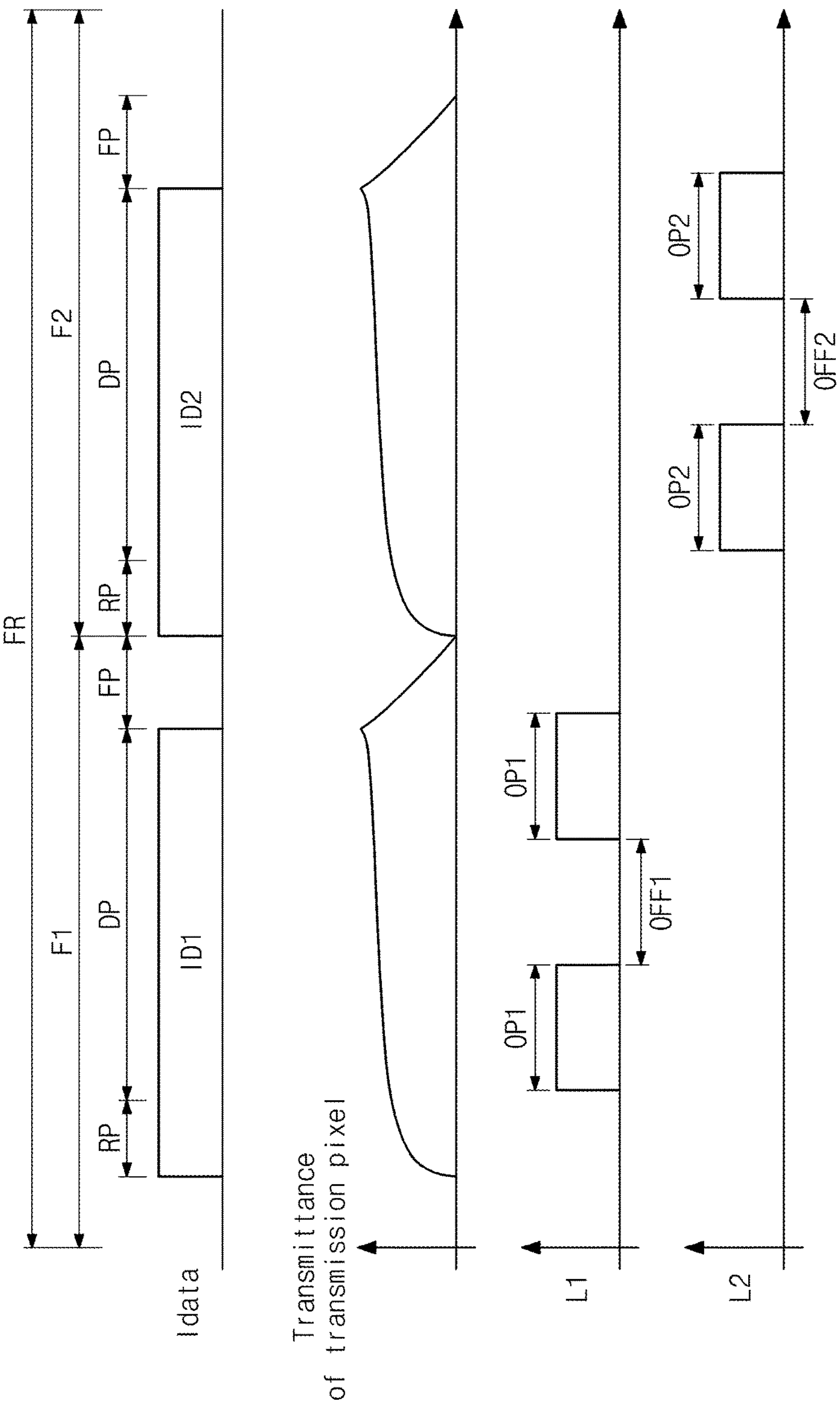
FIG. 9 is a view showing a time division driving operation of a display apparatus shown in FIG. 7 according to another exemplary embodiment of the present invention.

FIG. 9 is a view showing a time division driving operation of a display apparatus shown in FIG. 7 according to another exemplary embodiment of the present invention.

Referring to FIGS. 7 and 9, a first light source LS is turned on during a plurality of on periods OP1 during a first field F1, and turned off during a first off period OFF1. For example, the first field F1 may include two first on periods OP1.

During the first field F1, a rising period RP, a display period DP, and a falling period FP are defined in the first field F1 according to the transmittance of the transmissive pixel TPX. The transmittance of the transmissive pixel TPX corresponds to the first primary color image data ID1 applied to the transmissive pixel TPX during the display period DP. During the rising period, the transmittance of the transmissive pixel TPX increases to a transmittance level of the transmissive pixel TPX during the display period DP. During the falling period FP, the transmittance of the transmissive pixel TPX decreases to a transmittance level corresponding to a zero grayscale (e.g., a zero gray level) from the transmittance level during the display period DP.

The first on periods OP1 are provided during the display period DP of the first field F1, and are spaced in time from each other by the first off period OFF1. Accordingly, the first light L1 is provided during the display period DP (e.g., only during the display period DP), and the transmissive pixel TPX displays a grayscale (e.g., a gray level) corresponding to the first primary color image data ID1.

The first image is displayed during the first on periods OP1, and not displayed during the first off period OFF1. As described above, the first image is not provided to the display panel during the first off period OFF1, and the first image is provided to the display panel during the first field F1 after being divided in time, and thus, a flicker phenomenon may be reduced.

The second light source LS2 is turned on during a plurality of second on periods OP2 of the second field F2, and turned off during a second off period OFF2 of the second field F2. For example, the second field F2 may include two second on periods OP2. The second on periods OP2 are provided during the display period DP of the second field F2, and are spaced in time from each other by the second off period OFF2.

The second image is displayed during the second on periods OP2, and not displayed during the second off period OFF2. As a result, the transmissive pixel TPX displays a grayscale (e.g., a gray level) corresponding to the second primary color image data ID2, and thus, the flicker phenomenon may be reduced.

As an example, the first and second on periods OP1 and OP2 may have the same or substantially the same width as each other, and the first and second off periods OFF1 and OFF2 may have the same or substantially the same width as each other. However, the present invention is not limited thereto.

Figure 10:
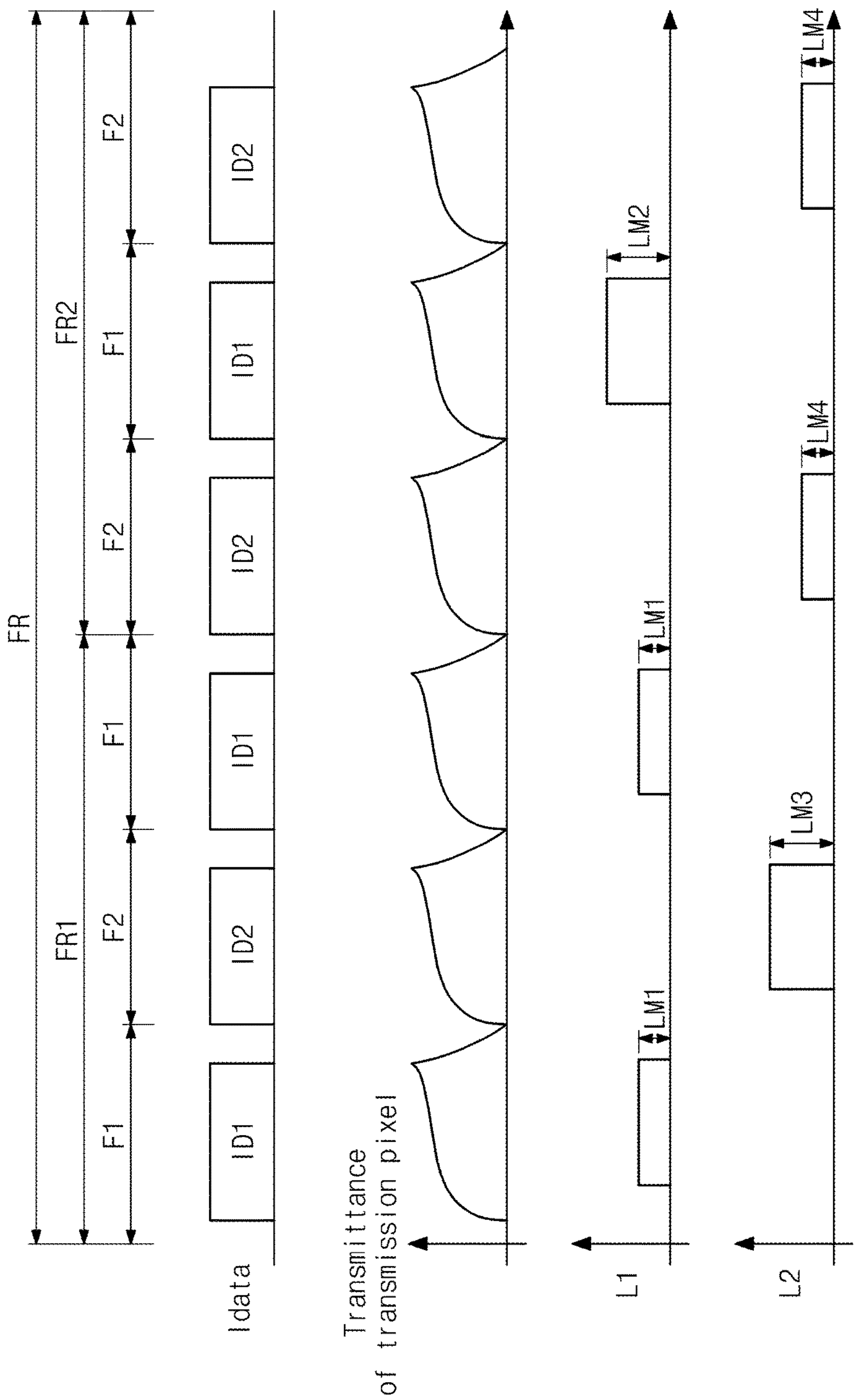
FIG. 10 is a view showing a time division driving operation of a display apparatus shown in FIG. 7 according to another exemplary embodiment of the present invention.

FIG. 10 is a view showing a time division driving operation of a display apparatus shown in FIG. 7 according to another exemplary embodiment of the present invention. One frame period FR includes a first frame period FR1 and a second frame period FR2, which are sequentially provided. FIG. 10 shows one frame period FR from among the frame periods that may be repeated.

The first frame period FR1 includes the first field F1, the second field F2, and the first field F1, which are sequentially arranged. The second frame period FR2 includes the second field F2, the first field F1, and the second field F2, which are sequentially arranged.

The transmissive pixel TPX receives the first primary color image data ID1 during each of the first fields F1 of the first frame period FR1. Accordingly, the transmissive pixel TPX has the transmittance corresponding to the first primary color image data ID1 during the first fields F1. In addition, the first light source LS1 emits the first light L1 during the first fields F1 of the first frame period FR1. The first light L1 has a first brightness LM1 during the first frame period FR1.

The first brightness LM1 of the first light L1 passing through the transmissive pixel TPX during the first field F1 of the first frame period FR1 is controlled by the transmittance of the transmissive pixel TPX. The transmissive pixel TPX displays the first image corresponding to the first frame period FR1 during the two first fields F1 using the first light L1.

The transmissive pixel TPX receives the first primary color image data ID1 during the first field F1 of the second frame period FR2. Therefore, the transmissive pixel TPX has the transmittance corresponding to the first primary color image data ID1 during the first field F1 of the second frame period FR2. In addition, the first light source LS1 emits the first light L1 during the first field F1 of the second frame period FR2. The first light L1 has a second brightness LM2 during the second frame period FR2.

The second brightness LM2 of the first light L1 passing through the transmissive pixel TPX during the first field F1 of the second frame period FR2 is controlled by the transmittance of the transmissive pixel TPX. The transmissive pixel TPX displays the first image corresponding to the second frame period FR2 during the one first field F1 of the second frame period FR2 using the first light L1.

The first brightness LM1 allows the first image corresponding to the first frame period FR1 to be displayed during the two first fields F1 of the first frame period FR1, and the second brightness LM2 allows the first image corresponding to the second frame period FR2 to be displayed during the one first field F1 of the second frame period FR2. As an example, the second brightness LM2 may be two times greater than the first brightness LM1, but the present invention is not limited thereto.

The transmissive pixel TPX receives the second primary color image data ID2 during the second field F2 of the first frame period FR1. Thus, the transmissive pixel TPX has the transmittance corresponding to the second primary color image data ID2 during the second field F2 of the first frame period FR1. In addition, the second light source LS2 emits the second light L2 during the second field F2. The second light L2 has a third brightness LM3 during the first frame period FR1.

The third brightness LM3 of the second light L2 passing through the transmissive pixel TPX during the second field F2 of the first frame period FR1 is controlled by the transmittance of the transmissive pixel TPX. The transmissive pixel TPX displays the second image corresponding to the first frame period FR1 during the one second field F2 of the first frame period FR1 using the second light L2.

The transmissive pixel TPX receives the second primary color image data ID2 during each of the second fields F2 of the second frame period FR2. Accordingly, the transmissive pixel TPX has the transmittance corresponding to the second primary color image data ID2 during the second fields F2 of the second frame period FR2. In addition, the second light source LS2 emits the second light L2 during the second fields F2 of the second frame period FR2. The second light L2 has a fourth brightness LM4 during the second frame period FR2.

As a result, the fourth brightness LM2 of the second light L2 passing through the transmissive pixel TPX during the second fields F2 of the second frame period FR2 is controlled by the transmittance of the transmissive pixel TPX. The transmissive pixel TPX displays the second image corresponding to the second frame period FR2 during the two second fields F2 using the second light L2.

The fourth brightness LM4 allows the second image corresponding to the second frame period FR2 to be displayed during the two second fields F2 of the second frame period FR2, and the third brightness LM3 allows the first image corresponding to the first frame period FR1 to be displayed during the one second field F2 of the first frame period FR1. As an example, the fourth brightness LM4 may be half of the third brightness LM3, but the present invention is not limited thereto.

In addition, the first brightness LM1 may be smaller than the third brightness LM3, and the fourth brightness LM4 may be smaller than the second brightness LM2.

Figure 11:
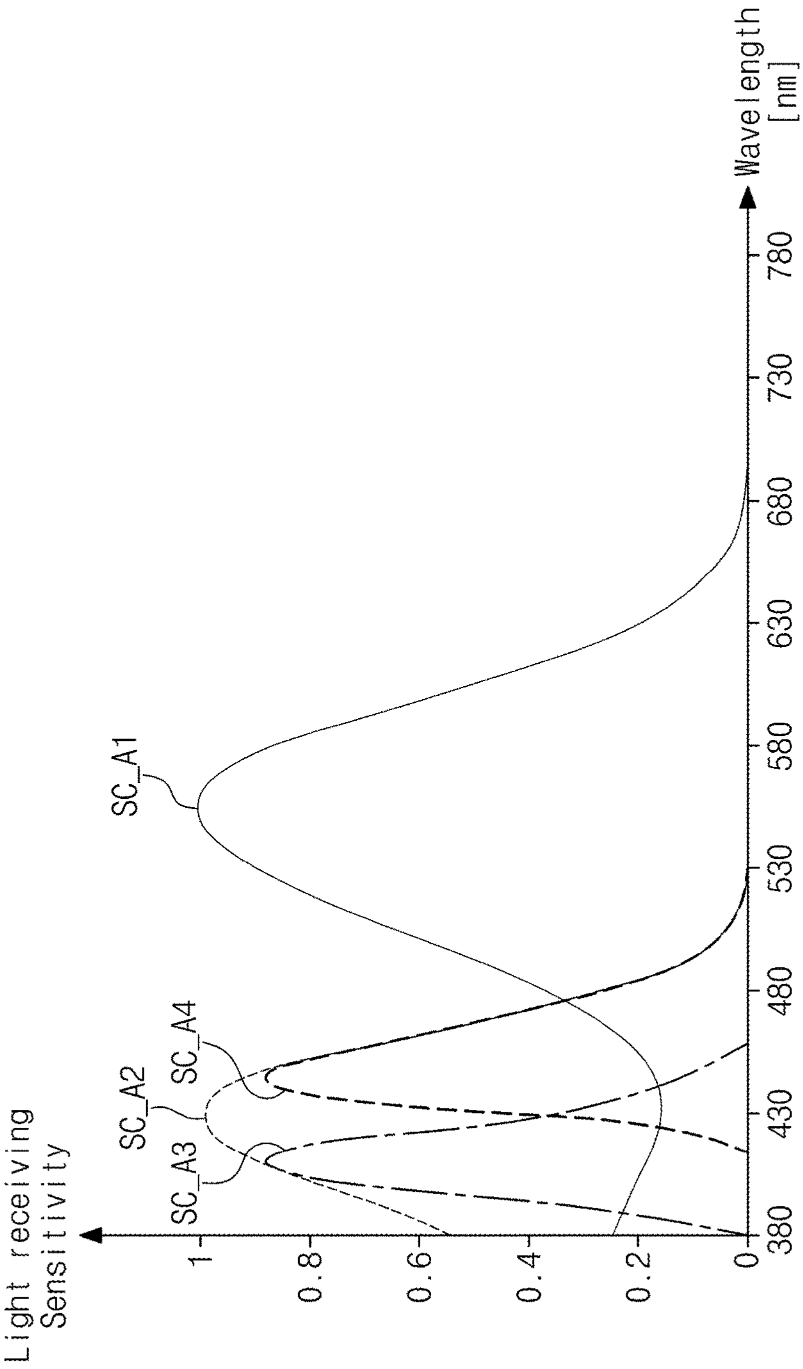
FIG. 11 is a view showing a short wavelength component and a long wavelength component of a second animal primary color.

FIG. 11 is a view showing a short wavelength component and a long wavelength component of a second animal primary color.

The second animal spectral sensitivity curve SC_A2 may be divided into the short wavelength component and the long wavelength component. As shown in FIG. 11, the spectrum SC_A3 of the short wavelength component of the second animal spectral sensitivity curve SC_A2 has a peak wavelength smaller than a peak wavelength of the second animal spectral sensitivity curve SC_A2. In addition, the spectrum SC_A4 of the long wavelength component of the second animal spectral sensitivity curve SC_A2 has a peak wavelength greater than the peak wavelength of the second animal spectral sensitivity curve SC_A2. Display apparatuses described below may display the second animal primary color corresponding to the second animal spectral sensitivity curve SC_A2 after dividing the second animal primary color corresponding to the second animal spectral sensitivity curve SC_A2 in time or in space using the short wavelength component and the long wavelength component.

Figure 12:
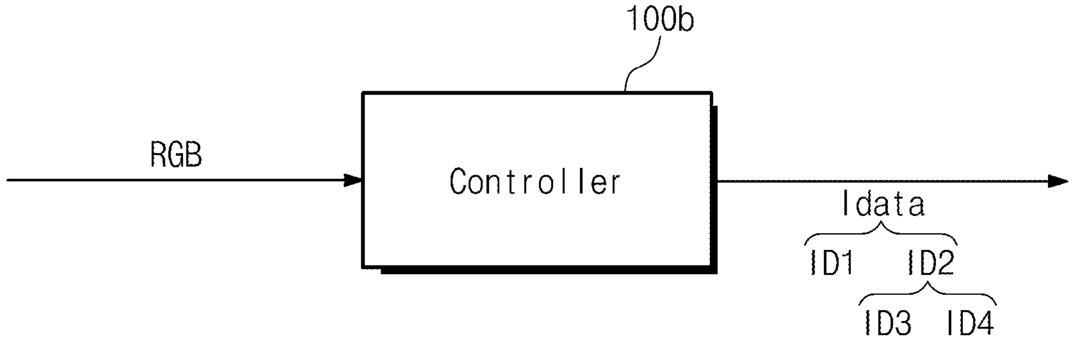
FIG. 12 is a view showing an operation of the controller shown in FIG. 1 according to another exemplary embodiment of the present invention.

FIG. 12 is a view showing an operation of a controller 100*b* corresponding to the controller 100 shown in FIG. 1 according to another exemplary embodiment of the present invention.

The controller 100*b* shown in FIG. 12 has the same or substantially the same structure and function as those of the controller 100*a* described with reference to FIG. 3, except that the second primary color image data ID2 includes third primary color image data ID3 and fourth primary color image data ID4.

The controller 100*b* receives input image data RGB, and outputs output image data Idata. The output image data Idata includes the first primary color image data ID1 and the second primary color image data ID2.

As described above, the second primary color image data ID2 includes information corresponding to the second animal primary color. For example, the second primary color image data ID2 includes the third primary color image data ID3 having information corresponding to the short wavelength component and the fourth primary color image data ID4 having information corresponding to the long wavelength component.

The third primary color image data ID3 may include information corresponding to the non-visible component. As described above, the non-visible component may include the ultraviolet ray and/or the near-ultraviolet ray. In addition, the third primary color image data ID3 may include only information corresponding to the non-visible component, and the fourth primary color image data ID4 may include only information corresponding to the blue color.

The controller 100*b* generates the output image data Idata based on the input image data RGB. For example, the controller 100*b* converts the input image data RGB to the output image data Idata based on the visual characteristics of the human and/or the visual characteristics of the animal (e.g., the dog). In more detail, the controller 100*b* may convert the input image data RGB to the output image data Idata based on the first and second animal spectral sensitivity curves SC_A1 and SC_A2 (refer to FIG. 11), or the spectrum SC_A3 of the short wavelength component and the spectrum SC_A4 of the long wavelength component.

The controller 100*b* may generate the third and fourth primary color image data ID3 and ID4 by using a correlation between the spectrum SC_A3 of the short wavelength component and the spectrum SC_A4 of the long wavelength component and between the first and second animal spectral sensitivity curves SC_A1 and SC_A2 and the first to third human spectral sensitivity curves SC_H1 to SC_H3, or by analyzing the spectrum of the input image data RGB and using the analyzed result.

Figure 13:
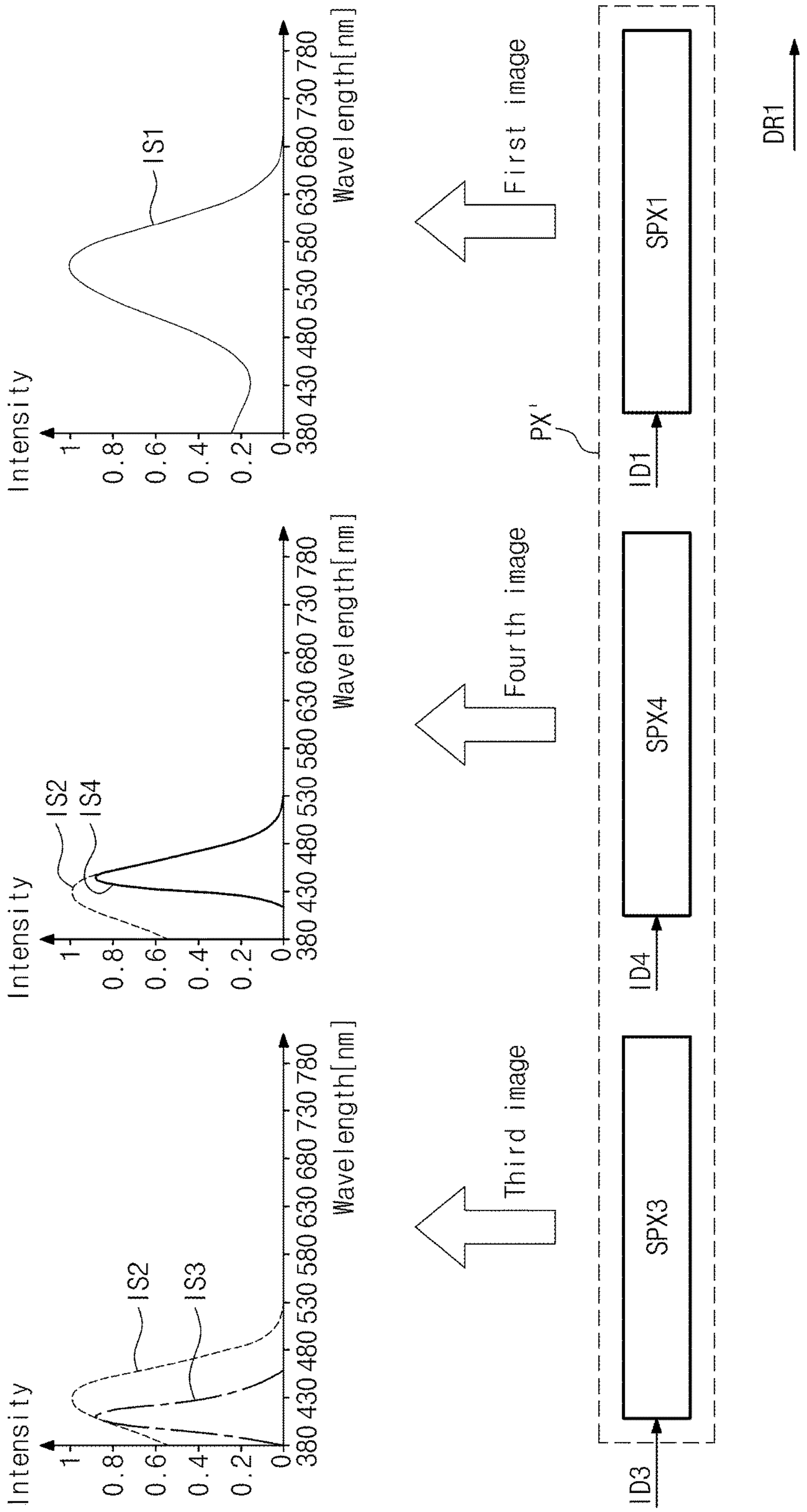
FIG. 13 is a view showing a pixel according to another exemplary embodiment of the present invention.

FIG. 13 is a view showing a pixel according to another exemplary embodiment of the present invention.

FIG. 13 shows a third sub-pixel SPX3, a fourth sub-pixel SPX4, and a first sub-pixel SPX1, which are sequentially arranged in the first direction DR1. Hereinafter, the pixel according to an exemplary embodiment will be described with reference to FIGS. 12 and 13.

The third sub-pixel SPX3, the fourth sub-pixel SPX4, and the first sub-pixel SPX1 may form one pixel PX'. The first sub-pixel SPX1 has been described with reference to FIG. 4, and thus, details thereof will be omitted.

The third and fourth sub-pixels SPX3 and SPX4 display third and fourth images, respectively.

The third image may represent the short wavelength component. For example, the third image has a third image spectrum IS3 corresponding to the spectrum SC_A3 of the short wavelength. In addition, the fourth image may represent the long wavelength component. For example, the fourth image has a fourth image spectrum IS4 corresponding to the spectrum SC_A4 of the long wavelength.

The third sub-pixel SPX3 receives the third primary color image data ID3, and displays the third image in response to the third primary color image data ID3. The fourth sub-pixel SPX4 receives the fourth primary color image data ID4, and displays the fourth image in response to the fourth primary color image data ID4. As an example, the third and fourth primary color image data ID3 and ID4 may be provided in the shape of the data voltage.

As described above, the third and fourth primary color image data ID3 and ID4 including the information corresponding to the second animal primary color, and the first primary color image data ID1 including the information corresponding to the first animal primary color, are provided to the pixel PX' instead of the input image data RGB generated in consideration of the visual characteristics of the human. In addition, when the first, third, and fourth sub-pixels SPX1, SPX3, and SPX4 are driven to display the first, third, and fourth primary color image data ID1, ID3, and ID4, respectively, the animal may perceive the same image as the real object's image through the first, third, and fourth images.

Figure 14:
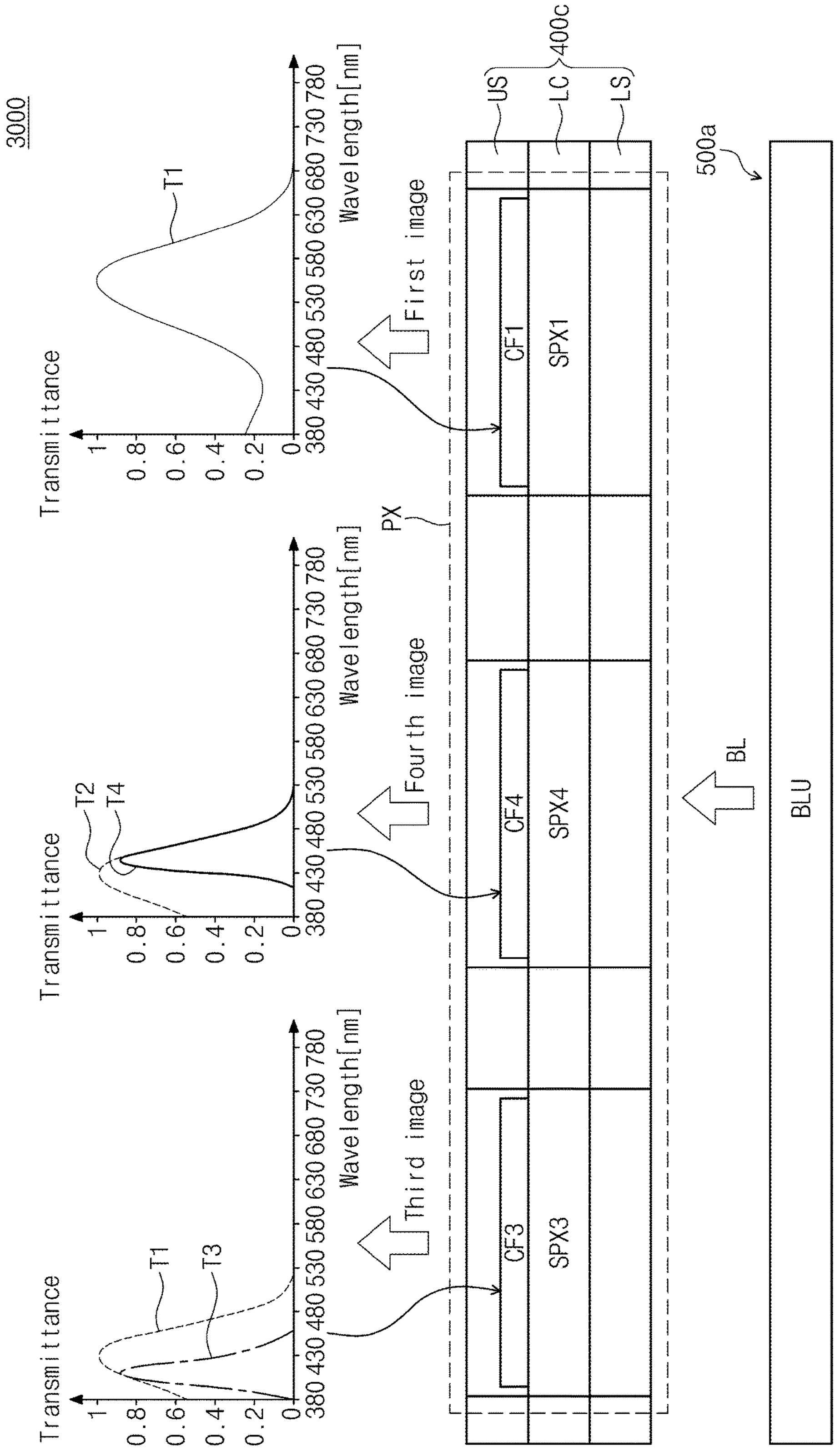
FIG. 14 is a cross-sectional view showing a display device according to another exemplary embodiment of the present invention.

FIG. 14 is a cross-sectional view showing a display device 3000 according to another exemplary embodiment of the present invention.

The display apparatus 3000 shown in FIG. 14 has the same or substantially the same structure and function as those of the display apparatus 1000 shown in FIG. 5, except that the display apparatus 3000 includes the third and fourth sub-pixels SPX3 and SPX4 instead of the second sub-pixel SPX2.

Referring to FIG. 14, the display apparatus 3000 may include a liquid crystal display, but the present invention is not limited thereto. In more detail, when the display apparatus 3000 includes the liquid crystal display, the display apparatus 3000 further includes a backlight unit (e.g., a backlight or a backlight source) 500*a* and a display panel 400*c*. The display panel 400*c* includes a lower substrate LS, an upper substrate US, a color filter, and a liquid crystal layer LC.

The upper and lower substrates US and LS include electrodes to form an electric field in the liquid crystal layer LC. The electrodes correspond to the first, third, and fourth sub-pixels SPX1, SPX3, and SPX4. Liquid crystal molecules included in the liquid crystal layer LC are controlled by the electric field, and thus, a transmittance of the first, third, and fourth sub-pixels SPX1, SPX3, and SPX4 are controlled.

The color filter includes a first color filter CF1, a third color filter CF3, and a fourth color filter CF4. As an example, the first, the third, and fourth color filters CF1, CF3, and CF4 are included in the upper substrate US, but the present invention is not limited thereto. The first, third, and fourth sub-pixels SPX1, SPX3, and SPX4 may have colors determined by the transmittance of the first, third, and fourth color filters CF1, CF3, and CF4, respectively.

In more detail, a third transmittance T3 of the third color filter CF3 may correspond to the spectrum SC_A3 (refer to FIG. 11) of the short wavelength component. For example, a center wavelength of the third transmittance T3 may be the same or substantially the same as a center wavelength of the spectrum SC_A3 of the short wavelength component. Accordingly, the third sub-pixel SPX3 displays the third image.

A fourth transmittance T4 of the fourth color filter CF4 may correspond to the spectrum SC_A4 (refer to FIG. 11) of the long wavelength component. For example, a center wavelength of the fourth transmittance T4 may be the same or substantially the same as a center wavelength of the spectrum SC_A4 of the long wavelength component. Accordingly, the fourth sub-pixel SPX4 displays the fourth image.

As described above, the display panel 400*c* may display the first, second, and third images to be spatially divided by using the first, third, and fourth color filters CF1, CF3, and CF4, respectively.

Figure 15:
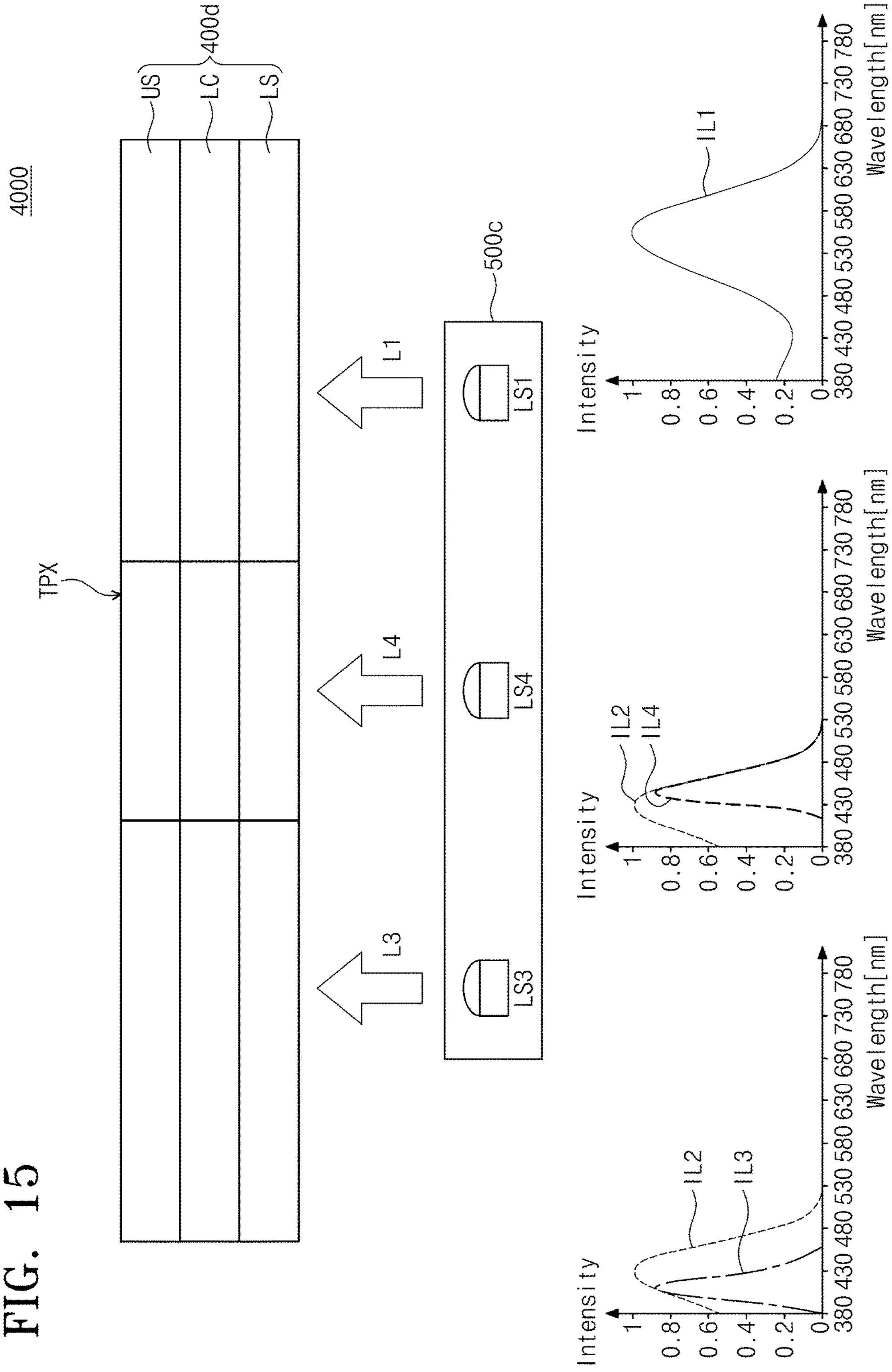
FIG. 15 is a cross-sectional view showing a display apparatus according to another exemplary embodiment of the present invention.

FIG. 15 is a cross-sectional view showing a display apparatus 4000 according to another exemplary embodiment of the present invention.

Referring to FIG. 15, the display apparatus 4000 includes a display panel 400*d* and a backlight unit (e.g., a backlight or a backlight source) 500*c*, and is driven in a time division driving method.

The display panel 400*d* includes the transmissive pixel TPX. The transmissive pixel TPX is the same or substantially the same as that shown in FIG. 7, and thus, details thereof will be omitted.

The backlight unit 500*c* includes a third light source LS3 for emitting a third light L3, and a fourth light source LS4 for emitting a fourth light L4. In addition, the backlight unit 500*c* includes the first light source LS1.

The third light L3 has a color corresponding to the short wavelength component. For example, the third light L3 has a third light spectrum IL3 corresponding to the spectrum SC_A3 of the short wavelength component. A center wavelength of the third light spectrum IL3 may be the same or substantially the same as the center wavelength of the spectrum SC_A3 of the short wavelength component. As an example, the third light L3 includes the non-visible component (e.g., the ultraviolet ray and/or the near-ultraviolet ray).

In addition, the fourth light L4 has a color corresponding to the long wavelength component. For example, the fourth light L4 has a fourth light spectrum IL4 corresponding to the spectrum SC_A4 of the long wavelength component. A center wavelength of the fourth light spectrum IL4 may be the same or substantially the same as the center wavelength of the spectrum SC_A4 of the long wavelength component.

Figure 16:
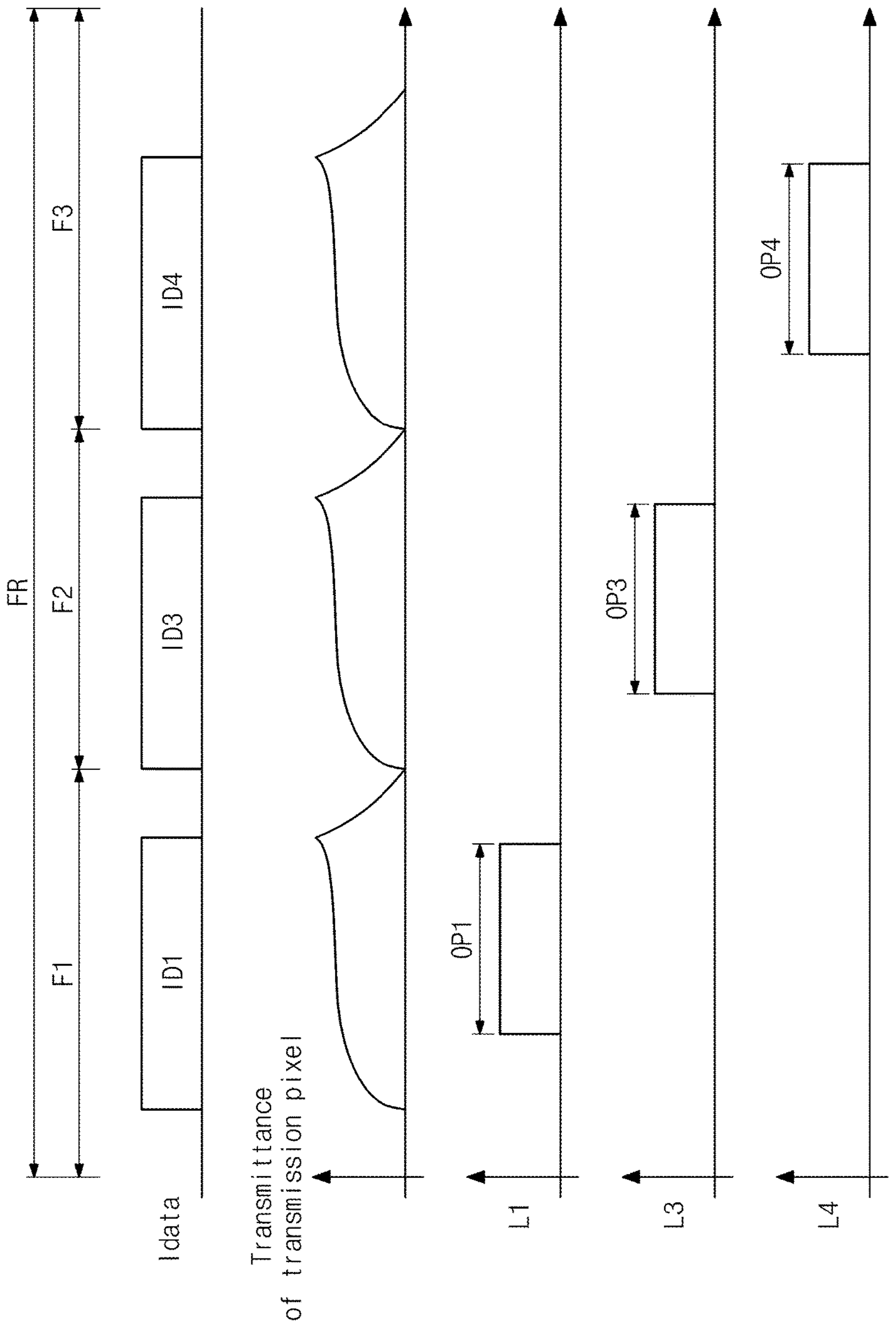
FIG. 16 is a view showing a time division driving operation of the display apparatus shown in FIG. 15.

FIG. 16 is a view showing a time division driving operation of the display apparatus shown in FIG. 15.

Hereinafter, the time division driving operation of the display apparatus will be described in more detail with reference to FIGS. 15 and 16. As shown in FIG. 16, one frame period FR includes a first field F1, a second field F2, and a third field F3, which are sequentially provided. FIG. 16 shows one frame period FR from among frame periods that may be repeated.

During the first field F1, the transmissive pixel TPX receives the first primary color image data ID1. Accordingly, the transmissive pixel TPX has the transmittance corresponding to the first primary color image data ID1.

In addition, the first light source LS1 emits the first light L1 during the first field F1. The first light L1 is provided during a first on period OP1 defined in the first field F1.

As a result, the first light L1 passing through the transmissive pixel TPX has a brightness that is adjusted by the transmittance of the transmissive pixel TPX, and the transmissive pixel TPX displays the first image using the first light L1.

The transmissive pixel TPX receives the third primary color image data ID3 during the second field F2. Therefore, the transmissive pixel TPX has the transmittance corresponding to the third primary color image data ID3.

In addition, each of the first and fourth light sources LS1 and LS4 is turned off during the second field F2, and the third light source LS3 emits the third light L3 during the second field F2. In more detail, the third light L3 is provided during a third on period OP3 defined in the second field F2. As an example, the third on period OP3 may have the same or substantially the same width as that of the first on period OP1.

The transmissive pixel TPX receives the fourth primary color image data ID4 during the third field F3. Thus, the transmissive pixel TPX has the transmittance corresponding to the fourth primary color image data ID4.

In addition, each of the first and third light sources LS1 and LS3 is turned off during the third field F3, and the fourth light source LS4 emits the fourth light L4 during the third field F3. In more detail, the fourth light L4 is provided during a fourth on period OP4 defined in the third field F3. As an example, the fourth on period OP4 may have the same or substantially the same width as that of the third on period OP3.

As described above, the display panel 400*d* displays the first, third, and fourth images corresponding to the first, third, and fourth primary color image data ID1, ID3, and ID4, respectively, after dividing the first, third, and fourth images in time using the first to third fields F1 to F3.

In addition, since the transmissive pixel TPX does not include the color filter, the transmissive pixel TPX transmits the first, third, and fourth lights L1, L3, and L4 without losing the light, which may be caused by the color filter. Accordingly, a light efficiency of the display apparatus 4000 may be improved.

To prevent or substantially prevent the flicker phenomenon from being perceived, the frame period FR may have a frequency higher than that of the critical frequency of the animal (e.g., the dog). For example, the frame period FR may have a frequency of about 80 Hz, and each of the first to third fields F1 to F3 may have a frequency of about 240 Hz.

Figure 17:
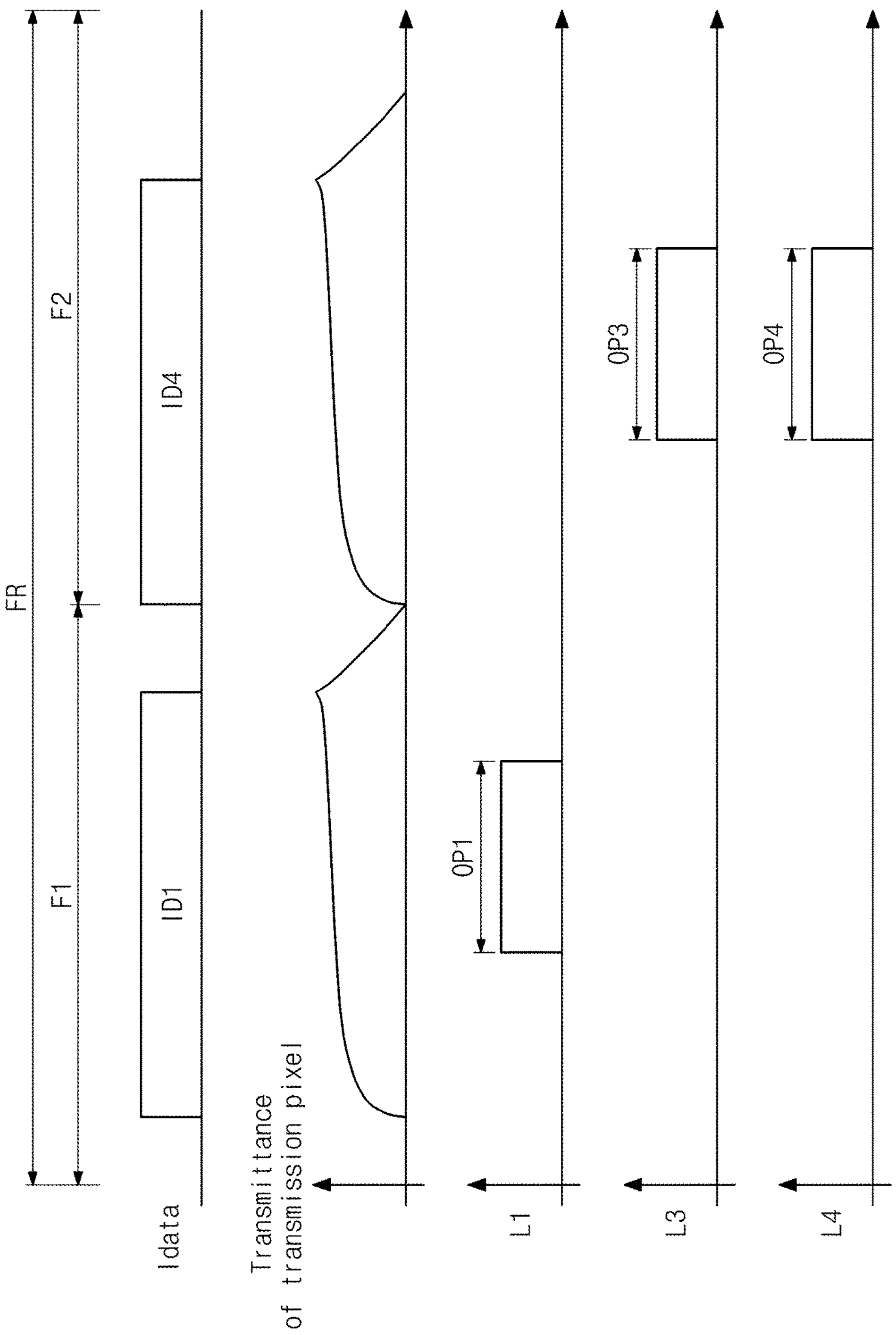
FIG. 17 is a view showing a time division driving operation of the display apparatus shown in FIG. 15 according to another exemplary embodiment of the present invention.
Figure 18:
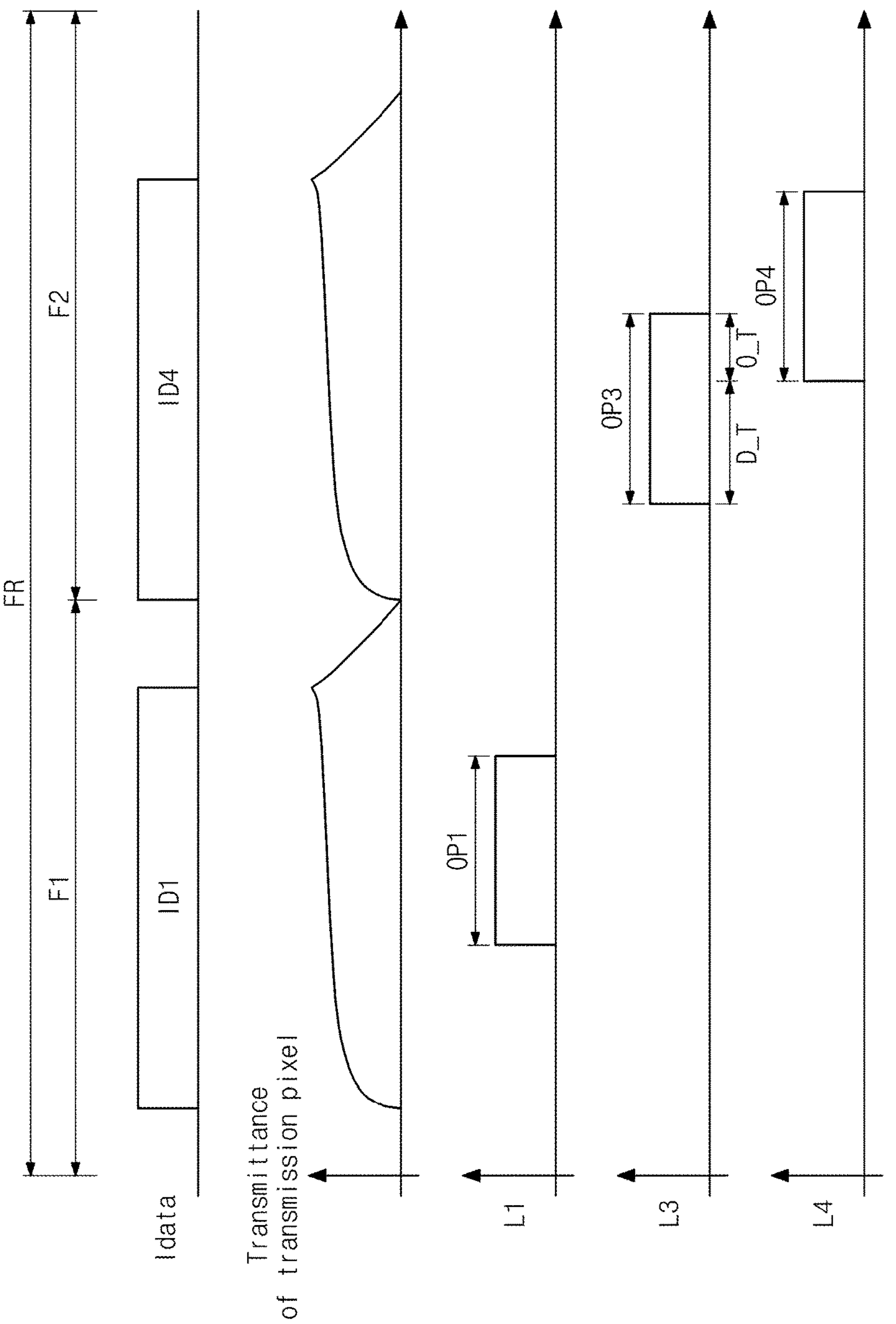
FIG. 18 is a view showing a time division driving operation of the display apparatus shown in FIG. 15 according to another exemplary embodiment of the present invention.

FIG. 17 is a view showing a time division driving operation of the display apparatus shown in FIG. 15 according to another exemplary embodiment of the present invention, and FIG. 18 is a view showing a time division driving operation of the display apparatus shown in FIG. 15 according to another exemplary embodiment of the present invention.

Referring to FIGS. 15 and 17, one frame period FR includes a first field F1 and a second field F2, which are sequentially provided. FIG. 17 shows one frame period FR from among frame periods that may be repeated.

During the first field F1, the transmissive pixel TPX receives the first primary color image data ID1. Accordingly, the transmissive pixel TPX has the transmittance corresponding to the first primary color image data ID1. In addition, the first light source LS1 emits the first light L1 during the first field F1.

The transmissive pixel TPX receives the fourth primary color image data ID4 during the second field F2. Therefore, the transmissive pixel TPX has the transmittance corresponding to the fourth primary color image data ID4. In addition, the third and fourth light sources LS3 and L4 emit the third and fourth lights L3 and L4, respectively, during the second field F2. For example, the third and fourth on periods OP3 and OP4 may be provided concurrently (e.g., simultaneously or at the same point in time). That is, the third and fourth lights L3 and L4 may be concurrently (e.g., simultaneously) emitted.

However, the present invention is not limited thereto. For example, as shown in FIG. 18, the fourth on period OP4 may be provided after being delayed by a delay time D_T compared to the third on period OP3. In this case, the third and fourth on periods OP3 and OP4 may be overlapped with each other by an overlap time O_T.

The short wavelength and the long wavelength have a high correlation. Therefore, the transmissive pixel TPX and the third and fourth light sources LS3 and LS4 may be driven such that the short and long wavelength components of the first animal primary color are displayed together during the second field F2.

In addition, the transmissive pixel TPX receives the fourth primary color image data ID4 during the second field F2 as shown in FIGS. 17 and 18, but the present invention is not limited thereto. According to another embodiment, the transmissive pixel TPX may receive the third primary color image data ID3 or new image data obtained by combining the third and fourth primary color image data ID3 and ID4. For example, the third and fourth primary image data ID3 and ID4 may be combined with each other in accordance with the correlation between the short wavelength component and the long wavelength component.

Example embodiments have been described with reference to the accompanying drawings. In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of the present invention have been described, it should be understood that the present invention is not limited to these exemplary embodiments, and that various changes and modifications may be made by one of ordinary skill in the art without departing from the spirit and scope of the present invention as set forth in the following claims, and their equivalents.

What is claimed is:

1. A display apparatus comprising:

a display panel configured to display a first image having a first image spectrum corresponding to a first animal spectral sensitivity curve of a first cone cell of an animal, and to display a second image having a second image spectrum corresponding to a second animal spectral sensitivity curve of a second cone cell of the animal, in response to output image data, wherein at least one of the first and second animal spectral sensitivity curves is different from first, second, and third human spectral sensitivity curves of cone cells of a human that perceive red, green, and blue colors, respectively, and wherein at least one of the first and second images has a non-visible component of an object to be displayed, and the non-visible component is perceivable only by the animal and not by the human.

2. The display apparatus of claim 1, further comprising a controller configured to output the output image data, wherein the output image data comprises:

first primary color image data including information of a first animal primary color corresponding to the first animal spectral sensitivity curve; and second primary color image data including information of a second animal primary color corresponding to the second animal spectral sensitivity curve, and wherein the display panel is configured to display the first and second images in response to the first and second primary color image data, respectively.

3. The display apparatus of claim 2, wherein at least one of the first and second animal primary colors is different from the red, green, and blue colors corresponding to visual characteristics of the human.

4. The display apparatus of claim 2, wherein at least one of the first and second images comprises a non-visible component that is not perceived by the human.

5. The display apparatus of claim 4, wherein the non-visible component comprises an ultraviolet ray and/or a near-ultraviolet ray.

6. The display apparatus of claim 4, wherein the controller is configured to generate information corresponding to the non-visible component from input image data.

7. The display apparatus of claim 2, wherein the controller is configured to receive input image data, and to convert the input image data to the first primary color image data and the second primary color image data based on the first and second animal primary colors, and wherein the input image data comprises information corresponding to the red, green, and blue colors.

8. The display apparatus of claim 1, wherein at least one of the first and second animal spectral sensitivity curves comprise a peak wavelength that is different from peak wavelengths of the first, second, and third human spectral sensitivity curves, and at least one of the first and second animal spectral sensitivity curves comprise a full width half maximum that is different from full width half maximums of the first, second, and third human spectral sensitivity curves.

9. The display apparatus of claim 8, wherein:

the peak wavelength of the second animal spectral sensitivity curve is shorter than the peak wavelength of the third human spectral sensitivity curve, the full width half maximum of the second animal spectral sensitivity curve is wider than the full width half maximum of the third human spectral sensitivity curve, the peak wavelength of the second animal spectral sensitivity curve is shorter than the peak wavelength of the first animal spectral sensitivity curve, and the peak wavelength of the third human spectral sensitivity curve is shorter than the peak wavelengths of the first and second human spectral sensitivity curves.

10. The display apparatus of claim 1, wherein the display panel comprises:

a first sub-pixel configured to display the first image; and a second sub-pixel configured to display the second image.

11. The display apparatus of claim 10, wherein the first sub-pixel comprises a first color filter having a first transmittance corresponding to the first animal spectral sensitivity curve, and the second sub-pixel comprises a second color filter having a second transmittance corresponding to the second animal spectral sensitivity curve.

12. The display apparatus of claim 11, wherein center wavelengths of the first and second transmittances are the same as center wavelengths of the first and second animal spectral sensitivity curves, respectively.

13. The display apparatus of claim 1, further comprising a backlight comprising:

a first light source configured to emit a first light having a first animal primary color corresponding to the first animal spectral sensitivity curve during a first field of a frame period; and a second light source configured to emit a second light having a second animal primary color corresponding to the second animal spectral sensitivity curve during a second field of the frame period, wherein the display panel comprises a liquid crystal layer, the display panel being configured to display the first image during the first field, and to display the second image during the second field.

14. The display apparatus of claim 13, wherein the first light source is configured to be turned on during a plurality of first on periods of the first field, and configured to be turned off during a first off period between the first on periods, and wherein the second light source is configured to be turned on during a plurality of second on periods of the second field, and configured to be turned off during a second off period between the second on periods.

15. The display apparatus of claim 13, wherein the frame period comprises a first frame period and a second frame period, which are sequentially arranged, the first frame period comprises the first field, the second field, and the first field sequentially arranged, and the second frame period comprises the second field, the first field, and the second field sequentially arranged.

16. The display apparatus of claim 15, wherein the first light has a brightness lower than a brightness of the second light during the first frame period, and the brightness of the first light is higher than the brightness of the second light during the second frame period.

17. The display apparatus of claim 1, wherein the second animal spectral sensitivity curve comprises a short wavelength component and a long wavelength component, wherein the second image comprises a third image having a third image spectrum corresponding to the short wavelength component, and a fourth image having a fourth image spectrum corresponding to the long wavelength component, and wherein the display panel is configured to divide the second image into the third and fourth images, and to display the third and fourth images.

18. The display apparatus of claim 17, wherein the display panel comprises a first sub-pixel configured to display the first image, a third sub-pixel configured to display the third image, and a fourth sub-pixel configured to display the fourth image.

19. The display apparatus of claim 18, wherein the first sub-pixel comprises a first color filter configured to transmit the first image, the third sub-pixel comprises a third color filter configured to transmit the third image, and the fourth sub-pixel comprises a fourth color filter configured to transmit the fourth image.

20. The display apparatus of claim 17, wherein the third image comprises an ultraviolet ray or a near-ultraviolet ray.

21. The display apparatus of claim 17, further comprising a backlight comprising:

a first light source configured to emit a first light having a first animal primary color during a first field of a frame period;

a third light source configured to emit a third light having a color corresponding to a third animal spectral sensitivity curve during a second field of the frame period; and a fourth light source configured to emit a fourth light having a color corresponding to a fourth animal spectral sensitivity curve during a third field of the frame period, wherein the display panel comprises a liquid crystal layer, the display panel being configured to display the first image during the first field, to display the third image during the second field, and to display the fourth image during the third field.

22. The display apparatus of claim 21, wherein the third light source is configured to emit the third light during a third on period, the fourth light source is configured to emit the fourth light during a fourth on period, and at least a portion of the third on period is overlapped with the fourth on period.

23. The display apparatus of claim 22, wherein a width of the third on period is the same as a width of the fourth on period, and the third and fourth on periods are provided concurrently.

24. A display apparatus comprising a display panel configured to display an image comprising a non-visible component of an object in response to output image data comprising information corresponding to the object and the non-visible component that is not perceived by a human, wherein the non-visible component is perceivable only by an animal.

25. The display apparatus of claim 24, wherein the non-visible component comprises an ultraviolet ray and/or a near-ultraviolet ray.

26. The display apparatus of claim 25, further comprising a backlight source configured to emit a light comprising the non-visible component, wherein the display panel is configured to receive the light and to display the image using the light.

27. The display apparatus of claim 26, wherein the display panel comprises a color filter configured to transmit the non-visible component.

28. The display apparatus of claim 24, further comprising a controller configured to receive input image data that does not include the non-visible component, and to convert the input image data to the output image data.

29. A display apparatus comprising:

a controller configured to map a first color gamut of input image data to a second color gamut to convert the input image data to output image data; and a display panel configured to display a first image having a first animal primary color, and to display a second image having a second animal primary color in response to the output image data, wherein the first color gamut comprises red, green, and blue colors, the second color gamut comprises the first and second animal primary colors, and wherein the first animal primary color comprises a first spectrum corresponding to a first animal spectral sensitivity curve of a first cone cell of an animal, and the second animal primary color comprises a second spectrum corresponding to a second animal spectral sensitivity curve of a second cone cell of the animal.

* * * * *